(12) United States Patent
Steele et al.

(10) Patent No.: US 7,379,913 B2
(45) Date of Patent: May 27, 2008

(54) ANONYMOUS TRANSACTION SYSTEM

(75) Inventors: Dale Everett Steele, Portland, OR (US); Kenneth Alan Silva, Vancouver, WA (US)

(73) Assignee: NextWorth, Inc., Portland, OR (US)

( * ) Notice: Subject to any disclaimer, the term of this patent is extended or adjusted under 35 U.S.C. 154(b) by 1056 days.

(21) Appl. No.: 09/995,298

(22) Filed: Nov. 27, 2001

(65) Prior Publication Data
US 2002/0072975 A1   Jun. 13, 2002

Related U.S. Application Data

(60) Provisional application No. 60/253,371, filed on Nov. 27, 2000.

(51) Int. Cl.
*G06Q 40/00* (2006.01)

(52) U.S. Cl. .......................... 705/38; 705/39
(58) Field of Classification Search ............ 705/38–42; 235/379–381
See application file for complete search history.

(56) References Cited

U.S. PATENT DOCUMENTS

| | | | | |
|---|---|---|---|---|
| 5,193,056 A | 3/1993 | Boes | ................. | 364/408 |
| 5,220,501 A | 6/1993 | Lawlor et al. | ............. | 364/408 |
| 5,239,462 A | 8/1993 | Jones et al. | ............... | 364/408 |
| 5,262,941 A * | 11/1993 | Saladin et al. | ................ | 705/38 |
| 5,274,547 A | 12/1993 | Zoffel et al. | ............... | 364/408 |
| 5,592,375 A | 1/1997 | Salmon et al. | .............. | 395/207 |
| 5,611,052 A | 3/1997 | Dykstra et al. | ............. | 395/238 |
| 5,614,927 A | 3/1997 | Gifford et al. | ............. | 395/612 |
| 5,704,045 A | 12/1997 | King et al. | ................. | 395/235 |
| 5,717,923 A | 2/1998 | Dedrick | .................... | 395/613 |
| 5,724,521 A | 3/1998 | Dedrick | .................... | 395/226 |
| 5,732,400 A * | 3/1998 | Mandler et al. | ............. | 705/26 |
| 5,754,938 A | 5/1998 | Herz et al. | .................. | 455/4.2 |
| 5,754,939 A | 5/1998 | Herz et al. | .................. | 455/4.2 |
| 5,758,328 A | 5/1998 | Giovannoli | ................. | 705/26 |
| 5,765,144 A | 6/1998 | Larche et al. | ................ | 705/38 |
| 5,794,207 A * | 8/1998 | Walker et al. | ................ | 705/1 |
| 5,797,133 A | 8/1998 | Jones et al. | .................. | 705/38 |
| 5,832,488 A * | 11/1998 | Eberhardt | .................... | 707/10 |
| 5,867,799 A | 2/1999 | Lang et al. | ................... | 707/1 |
| 5,878,403 A | 3/1999 | DeFrancesco | ............... | 705/38 |
| 5,913,202 A * | 6/1999 | Motoyama | .................. | 705/35 |
| 5,924,082 A | 7/1999 | Silverman et al. | .......... | 705/37 |

(Continued)

FOREIGN PATENT DOCUMENTS

EP   000399850 A2 *  11/1990

OTHER PUBLICATIONS

Deloitte Research & Consulting Study, 1999, "The New Economics of Transactions" pp. 1-33.

*Primary Examiner*—Hani M. Kazimi
(74) *Attorney, Agent, or Firm*—Stolowitz Ford Cowger LLP

(57) ABSTRACT

An Anonymous Transaction Service (ATS) solves or alleviates the problems outlined above. The ATS provides anonymous, automated, risk-based differential pricing that allows consumers to receive offers from multiple suppliers with only a single credit report. The ATS facilitates any offer between a supplier and consumer that first requires an evaluation of the risk associated with making the offer. The ATS can be used for any product or service, such as credit cards, home mortgages, automobile loans, appliance loans, debt consolidation loans, insurance products, advertising and dating services, to name only a few.

25 Claims, 20 Drawing Sheets

U.S. PATENT DOCUMENTS

| | | | |
|---|---|---|---|
| 5,940,812 A | 8/1999 | Tengel et al. | 705/38 |
| 5,961,593 A | 10/1999 | Gabber et al. | 709/219 |
| 5,995,947 A | 11/1999 | Fraser et al. | 705/38 |
| 6,009,410 A | 12/1999 | LeMole et al. | 705/14 |
| 6,012,051 A | 1/2000 | Sammon, Jr. et al. | 706/52 |
| 6,049,782 A | 4/2000 | Gottesman et al. | 705/35 |
| 6,076,080 A | 6/2000 | Morscheck et al. | 705/400 |
| 6,119,098 A | 9/2000 | Guyot et al. | 705/14 |
| 6,131,087 A | 10/2000 | Luke et al. | 705/26 |
| 6,148,343 A | 11/2000 | Lewine | 709/229 |
| 6,182,048 B1 | 1/2001 | Osborn et al. | 705/4 |
| 6,208,979 B1 | 3/2001 | Sinclair | 705/38 |
| 6,275,824 B1 | 8/2001 | O'Flaherty et al. | 707/9 |
| 6,278,993 B1 | 8/2001 | Kumar et al. | 707/3 |
| 6,324,524 B1 * | 11/2001 | Lent et al. | 705/38 |
| 6,385,594 B1 | 5/2002 | Lebda et al. | 705/38 |
| 6,607,136 B1 | 8/2003 | Atsmon et al. | 235/492 |
| 6,611,816 B2 | 8/2003 | Lebda et al. | 705/38 |
| 2001/0029496 A1 | 10/2001 | Otto et al. | 705/74 |
| 2002/0077964 A1 * | 6/2002 | Brody et al. | 705/38 |

* cited by examiner (BACKGROUND)

FIG.6

ANONYMOUS TRANSACTION SYSTEM

This application claims priority in U.S. Provisional Patent Application Ser. No. 60/253,371, filed Nov. 27, 2000, entitled ANONYMOUS TRANSACTION SYSTEM.

BACKGROUND OF THE INVENTION

The current model for financial services poses significant disadvantages for both the consumer and the supplier of any product or service that requires an evaluation of the consumer's credit report. The current process is familiar to most everyone. Approval for a financial service offer requires obtaining the applicant's credit report. Any financial service supplier pulling a credit report must have a consumer's personal information. Therefore, it is impossible to shop anonymously directly with the company providing the service. With each credit report requested, the consumer's credit rating is further harmed, making it undesirable to apply frequently. As a result, consumers fail to receive the best offer that they qualify for because they can't compare offers from a broad range of suppliers without negatively impacting their credit rating.

There are other problems associated with the current financial services model. For example, consumers cannot determine, from advertising, if they qualify for a particular offer until they apply to the supplier. Consumers cannot determine if an offer from a particular supplier is the best one that they can receive from that supplier. Most suppliers will not tell a consumer that they qualify for the advertised loan at 12% interest and also tell them they qualify for a loan at 8%. Consumers with poor credit are frequently excluded from the majority of offered financial services, but could also benefit from the ability to receive multiple competitive offers from those suppliers willing to extend credit to sub-prime borrowers. Consumers cannot easily shop for and compare offers to replace their existing services, and they cannot shop for and compare offers for multiple services from the same supplier and take advantage of relationship rates.

The present situation is also detrimental to the supplier of good and services. Since there is no realistic way to determine the risk associated with lending to a consumer before that consumer applies, the supplier must advertise to a broad spectrum of consumers in order to obtain consumers who fit in the desired range of risk, thereby increasing the cost for the supplier. Suppliers also cannot price to actual consumer risk before making the offer. Typically, most financial services are uniformly priced over a wide range of credit scores to ensure the widest range of acceptances to cover marketing, sales and processing costs, and an acceptable rate of rejections and the resulting consumer dissatisfaction. This uniform pricing system is detrimental to the consumer as well, because those with higher credit scores (and less risk) are qualifying for the same product that those with lower credit scores (and higher risk) qualify for, forcing those who would otherwise qualify for a better rate to cross subsidize those at the lower end of the qualification range.

SUMMARY OF THE INVENTION

An Anonymous Transaction Service (ATS) solves or alleviates the problems outlined above. The ATS provides anonymous, automated, risk-based differential pricing that allows consumers to receive offers from multiple suppliers with only a single credit report. The ATS facilitates any offer between a supplier and consumer that first requires an evaluation of the risk associated with making the offer. The ATS can be used for any product or service, such as credit cards, home mortgages, automobile loans, appliance loans, debt consolidation loans, insurance products, advertising and dating services, to name only a few.

BRIEF DESCRIPTION OF THE DRAWINGS

FIG. 6 is an illustration of a computer generated display seen by the consumer when applying for a financial product.

DETAILED DESCRIPTION

Definitions

Suppliers are defined as any individual or company offering or brokering risk-based priced products and services where risk is determined based on the current status and historical experience or record of a consumer. Typical risk-based priced products and services include loans (auto, personal, student, secured, unsecured), mortgages (first or second), lines of credit (secured or unsecured), credit cards, debit cards, leases, auto insurance, life insurance, health insurance, accidental death and dismemberment insurance, disability insurance, medical services, etc.

Consumers are defined as any consumer of small businesses requesting risk-based prices products and services where the risk is determined based on the current status and historical experience or record of the consumer or small business principle.

Personal information supplied by applicant includes information that identifies a specific person, family or business, including name (first, middle, last, family, Christian, surname, given name, maiden name, married name, business name, registered business name, etc.), address (number and street, apartment name and number, rural delivery route, Post Office box number, etc.), complete telephone number, identifying number (Social Security Number, Driver's License Number, Dun and Bradstreet D-U-N-S Number, State Registration Number, Federal Tax Identification Number/Employer Identification Number (EIN), Business License Number), birth date, phone number (voice or fax), Uniform Resource Identifier (URI), Uniform Resource Locator (URL), etc.

Anonymous information supplied by a consumer includes information requested of a consumer that cannot reasonably and normally be used to identify a specific person, family or business including: city, county, state, country, other governmental area designation, zip code, postal code, telephone area code, status information (renter, homeowner, employed, retired, student, self-employed, etc.), income and ability to document income, net worth, savings, outstanding debt, etc.

Personal third-party information includes any information requested of a third-party and/or provided by the third party that identifies a specific individual, family or business including but not limited to name, address, phone number, identifying numbers, URI, URL, credit account numbers, insurance policy numbers, insurance claim numbers, judgment and court proceeding case names and numbers, specific claim information, specific medical procedure information, etc.

Anonymous third-party information includes any information requested of a third-party and provided by the third-party that is specific to the consumer or consumer's family but cannot reasonably and normally be used to identify a specific person, family or business including credit score, amount of credit extended by credit-granting agencies, amount of credit used, late payment information, number of driving accidents, number of points on drivers license, etc.

Figure 1:
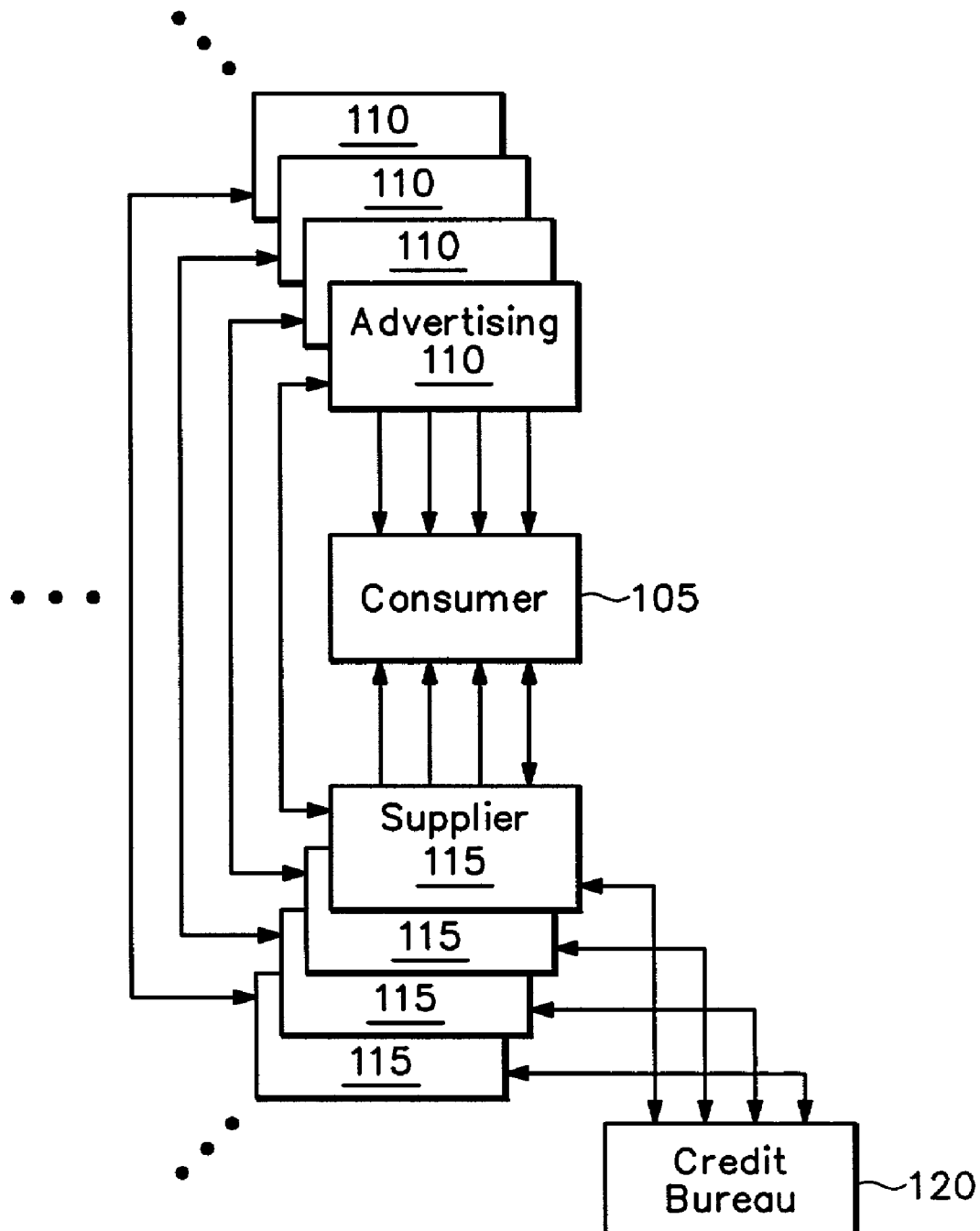
FIG. 1 is a background block diagram of a current model that is followed for financial service transactions.

FIG. 1 shows a typical transaction for a product or service that requires an evaluation of the consumer's credit rating. There exist a plurality of suppliers 115, each of which sells a single or multiple financial products and services. In order to sell the product or service, the suppliers 115 must generate a plurality of advertisements 110. A typical consumer 105 is exposed to the advertisements 110 via a variety of methods, such as mass mailings, television, radio, and print. A percentage of the consumers reached in this fashion will respond to the advertisements, since only a few are in the market for a particular product at the time the advertisement is running. If the consumer is in the market for the product or service, they must apply directly to the supplier 115 that is offering it. The supplier, in turn, uses personal information supplied by the consumer 105 to request and receive the consumer' credit report from the credit bureau 120.

At this point the supplier 115 evaluates the consumer's credit report. Of the consumers who apply, some will not be approved, others will be approved but at a lending rate that is unacceptable to the consumer, and others are approved at the lending rate that the supplier is willing to associate with the product. Further, of all the potential suppliers 115 that a consumer 105 could apply to, as a practical matter only a few suppliers will receive applications from the consumer. This is because the consumer's credit rating decreases in inverse proportion to the number of credit reports requested for that particular consumer. This makes for a very inefficient process that is undesirable from both the consumer's and the supplier's perspective.

Figure 2:
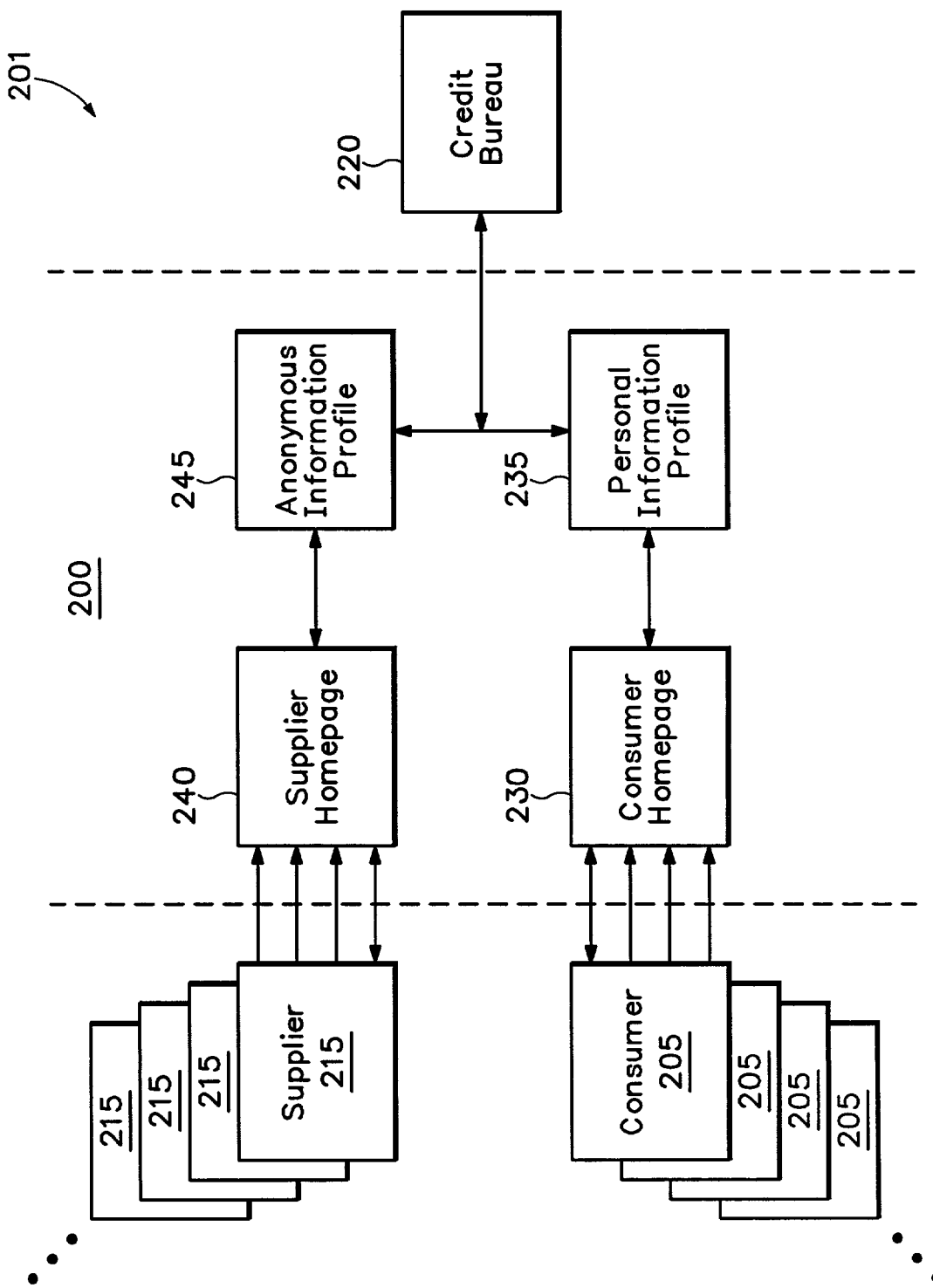
FIG. 2 is a block diagram of an Anonymous Transaction System (ATS) according to one embodiment of the invention.

FIG. 2 is a block diagram of an Anonymous Transaction Service (ATS) 201. A difference between FIG. 1 and FIG. 2 is that there is now an intermediary (represented by the blocks within zone 200) between a plurality of suppliers 215 and a plurality of consumers 205. This is a form of indirect financing, where consumers do not apply directly to the supplier for credit. Consumers 205 and suppliers 215 exchange information with the intermediary via network connections and a user interface. In this embodiment the user interfaces are a consumer homepage 230 and a supplier homepage 240. A consumer 205 submits an application to the intermediary 200, where the consumer's application is separated into a personal information profile 235 that uniquely identifies the consumer and an anonymous information profile 245 composed of information about the consumer that cannot be used to uniquely identify the consumer. For example, a consumer's name and social security number are examples of personal information, while the consumer's age and range of yearly personal income are examples of anonymous information. In one embodiment of the present invention, the consumer selects the products or services that he wishes to receive offers for and this information also becomes part of the anonymous information profile 245.

The intermediary 200, using both personal and anonymous consumer information, requests and receives a credit report on the consumer from a credit bureau 220. The credit report is purged of any personal information and placed in the consumer's anonymous information file 245. Each supplier 215 then has access to the consumer's anonymous information 245 through the supplier homepage 240. In one embodiment of the present invention, the intermediary 200 uses digital certification techniques to authenticate the anonymous information profile 245 corresponding to a real, unique consumer. The anonymity of the consumer at this stage of the process is assured because the consumer's personal information 235 is masked from the supplier. However, the supplier 215 now has access to a real consumer profile and a valid credit rating. With this information the supplier can effectively price their products and services to the exact credit risk of the consumer. The supplier 215 may also group or sort the plurality of anonymous information profiles according to the information contained in the anonymous information profile 245, such as age, gender, credit rating, etc. The supplier can thereby efficiently price their product or service while the consumer maintains their anonymity.

In order to make an offer to one or more consumers, the supplier 215 selects a desired subset of the anonymous information profiles 245 based on information contained within the anonymous information profile 245. The offers are sent to the intermediary 200 via the supplier homepage 240. Intermediary 200 associates the selected subset of anonymous profiles 245 for the consumers selected to receive offers with corresponding personal information profiles 235. The offers are delivered to the corresponding unique consumer 205 via the consumer homepage 230. The consumer then reviews the pending offers for goods or services, compares and contrasts them, and can accept the best one.

Once a consumer 205 accepts a pending offer, only at that time is the consumer's personal information profile 235 given to the supplier 215 whose offer was accepted. This could be done in a variety of ways, such as having the intermediary 200 send the consumer's personal information profile 235 to the supplier 215 or have the consumer 205 contact the supplier directly. This allows the supplier to complete the information it needs to fully process the accepted offer. Even though the consumer was pre-approved through his anonymous information profile 245 before the offer was ever made, the supplier can obtain another credit report to make sure that the credit rating status remains unchanged. In another embodiment, the intermediary 200 continues to receive offers on a consumer's behalf even after the consumer has accepted an offer for that product. This allows the consumer to easily determine if the current product or service can be replaced.

Figure 3:
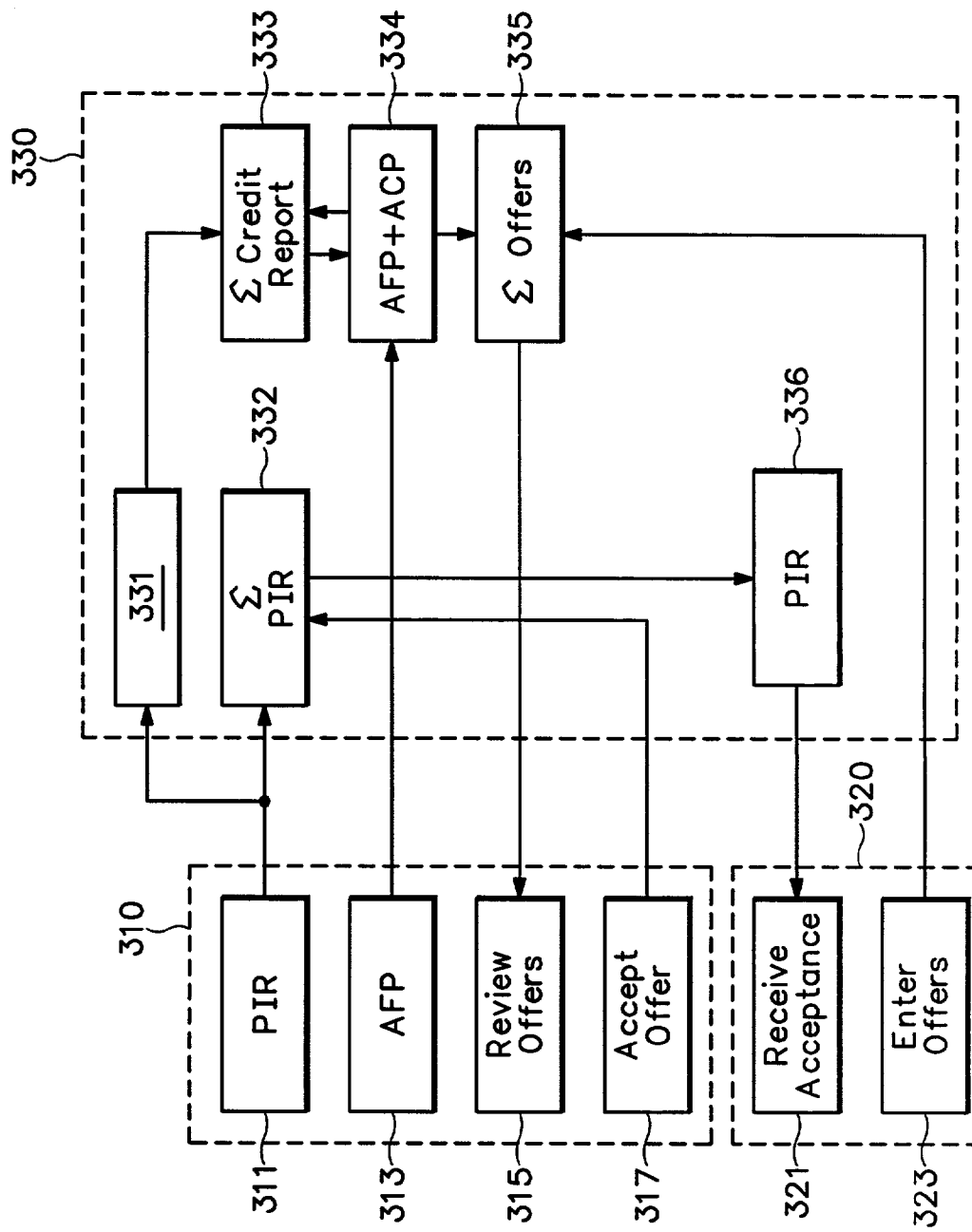
FIG. 3 is a block diagram of the processes implementing the ATS.

FIG. 3 is a block diagram implementing a second embodiment. The dashed squares 310, 320, and 330 represent the actions taken by the consumer, the supplier, and the intermediary, respectively. The directional arrows interconnecting the blocks indicate the logical order in which the processes are accomplished.

Blocks 311 and 313 represent the consumer's request for service. The consumer fills out an application, which is separated into a Personal Information Report (PIR) and an Anonymous Financial Profile (AFP). The PIR contains the information that uniquely identifies the consumer and it is necessary to request a credit report. The AFP contains other information that while belonging to a particular consumer cannot be used to uniquely identify the consumer. The PIR and AFP are used by the intermediary 330 in block 331 and block 334 to request and receive a credit report from a credit bureau (not shown). At block 333, the credit report is modified to remove all personal information that uniquely identifies the consumer to form an Anonymous Credit Profile (ACP). The intermediary 330 maintains all PIRs from all consumers in block 332 along with all the ACPs obtained from block 333.

At block 334, the intermediary 330 merges the AFP obtained from block 313 with the ACP obtained from block 333. In one embodiment, intermediary 330 is a computer system and blocks 332, 333, and 334 are automatically performed by the computer system. Meanwhile, supplier 320 submits offers to the intermediary 330 at block 323. The supplier submits a desired profile of applicant-submitted anonymous information, and third-party supplied anonymous information that the intermediary 330 uses to compare with the stored AFPs and ACPs in block 335. If there are matches, the intermediary 330 forwards the offer to the consumer 310 corresponding to the matching AFP and ACP. Matches can include a credit rating above a threshold level defined by the supplier or any other supplier criteria. For example, the supplier can base acceptance on any combination of age, home ownership, yearly income, credit rating, etc. The consumer can then compare all offers.

Consumer 310 indicates their acceptance of the supplier offer at block 317, which triggers the intermediary 330 to retrieve the consumer's PIR in block 336 previously stored in block 332 and forward it to the supplier 320 in block 321. In one embodiment, the consumer 310 and the supplier 320 are connected to the intermediary 330 via the Internet with a network connection such as a telephone modem, cable modem, DSL, or wireless link.

Figure 4:
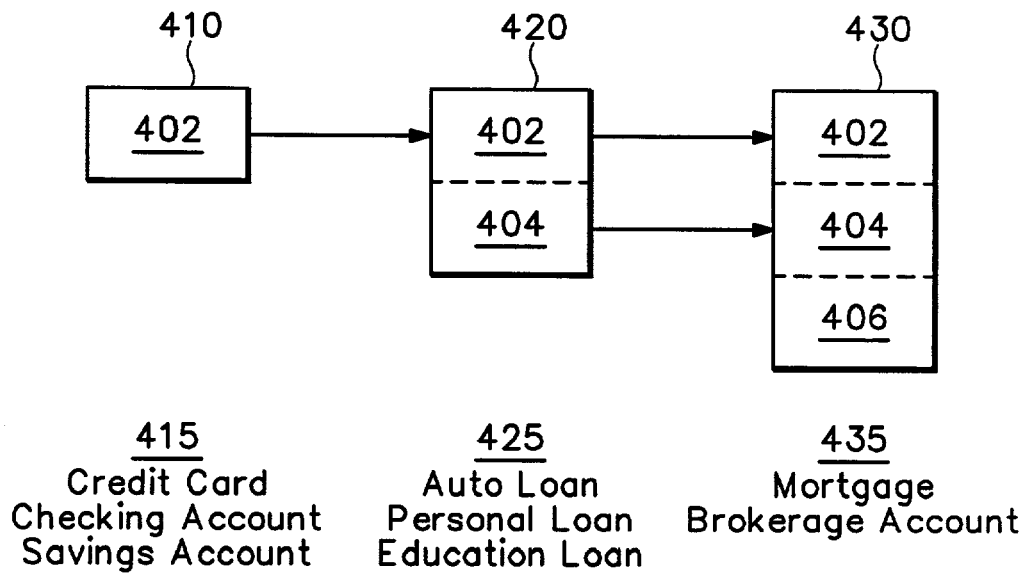
FIG. 4 is a block diagram illustrating a consumer application process used with the ATS.

FIG. 4 is a block diagram illustrating the consumer application process. Blocks 410, 420, and 430 represent the applications required to apply for financial services found in lists 415, 425, and 435, respectively. Each of the applications 410, 420, and 430 is composed of one or more data sets. The data set 402 is the only data set required for a credit card application while data sets 402, 404, and 406 are required for a home mortgage.

The same data sets may appear in multiple applications because this represents the common information that is required by all the applications. For example, the personal information necessary to request a credit report on a consumer is found in data set 402, and the same information is used for any application, whether for a credit card or a home mortgage. An application 420 for a loan appearing in list 425 requires more information than an application for a product appearing in list 415. This additional information is represented by data set 404.

Once a consumer has entered a data set there is no need to re-enter the information in that data set for separate products because the same data set is used across multiple applications. Suppose a consumer wants to apply for an auto loan. The consumer would fill out application 420, composed of data sets 402 and 404. The intermediary requests a credit report on the consumer with the personal information supplied in data set 402. Later, if the consumer wished to apply for a credit card, there is no need to fill out an additional application 410 because data set 402 is extracted from auto loan application 420.

On the other hand, if a brokerage account is desired the consumer must add supplemental information represented by data set 406. Data set 406 provides the additional information necessary for brokerage account application 430. But it is unnecessary to re-enter data sets 402 and 404. The consumer may update information contained in data sets 402, 404, and 406 according to changing personal or financial information. This incremental process utilized by the intermediary 330 saves both the consumer and the supplier a significant amount of time.

Figure 5:
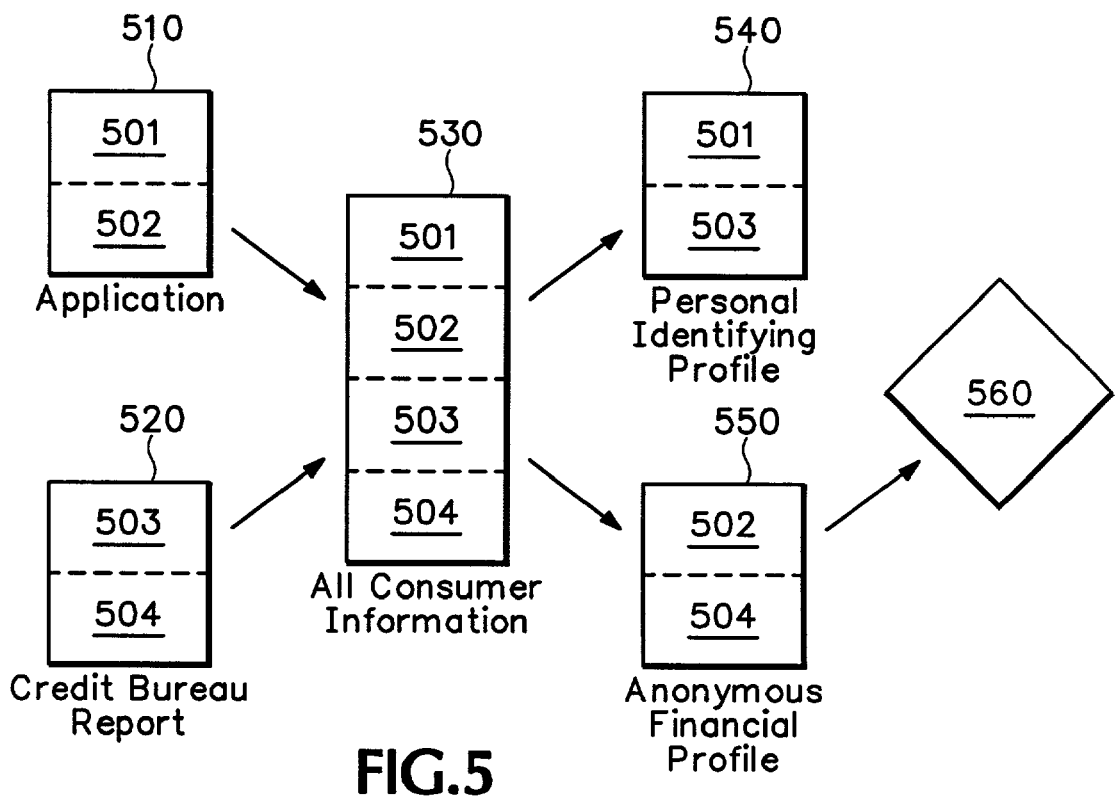
FIG. 5 is a block diagram illustrating a process of creating an anonymous and personal profile from a consumer application.

FIG. 5 is a block diagram illustrating the process of creating an anonymous and personal profile from each consumer's application. Block 510 represents a generic application for a financial service that a consumer submits to the intermediary. The information about the consumer contained in application 510 can be separated into two data sets 501 and 502. Data set 501 is the information that uniquely identifies the consumer, and data set 502 is the information that is not unique to the consumer. Examples of data set 501 may include a consumer's name, social security number, street address, or mother's maiden name. Examples of data set 502 can include the consumer's age, yearly income (identified by ranges rather than specific amounts), sex, nationality, hobbies, home ownership status, etc.

Once the application 510 is submitted to the intermediary, the intermediary uses the consumer's information from data set 501 and data set 502 to request a credit bureau report 520. Like the application 510, the credit bureau report 520 contains a data set 503 that uniquely identifies the consumer and a data set 504 that does not. In the case of credit bureau report 520, data set 504 contains the consumer's credit rating.

Block 530 represents the totality of the information that the intermediary obtains concerning the consumer, either through the application 510 or credit bureau report 520. The intermediary separates the information 530 into a personal identifying profile 540 and an anonymous financial profile 550. The personal identifying profile 540 contains the data sets 501 and 503 taken from the application 510 and credit bureau report 520, respectively, that uniquely identify the consumer.

The anonymous financial profile 550 contains the consumer's credit rating and other financial information in data set 504 along with other information about the consumer from data set 502 that does not uniquely identify the consumer.

The intermediary allows suppliers of personal financial products and services 560 access to the consumer's anonymous financial profile 550, and in a preferred embodiment software tools are provided so that the suppliers 560 can group and sort consumers according to the information in the consumers' anonymous profiles 550, which are maintained as a computer network-accessible database.

The consumer's personal identifying profile 540 is unavailable to the suppliers 560 until such a time that a consumer accepts an offer for a financial product from a supplier. At that time, the intermediary then allows one of the suppliers 560 whose offer was accepted by the consumer access to the consumer's personal identifying profile 540.

There is no need to request a credit bureau report every time the consumer desires a different financial product or service. The same anonymous profile 550 containing the consumer's credit rating 504 is available to multiple suppliers who offer a variety of different products and services. Other methods for obtaining financial products and services require a separate credit report request for each supplier, because the consumer deals with the supplier directly.

Thus, assuming that the consumer wishes to receive offers for p products from k different suppliers and that each supplier offers only one product, a total of (k×p) separate credit reports is required. With the present invention only one credit report is required for a consumer to receive hundreds of offers for multiple products.

Once an offer is accepted by the consumer, the supplier will typically require another credit report to verify that the consumer's credit rating remains the same as that indicated in the anonymous financial profile 550. So, regardless of the number of offers that a consumer receives or the number of suppliers k that makes an offer, for every p products requested by the consumer, there are only (p+1) separate credit report requests necessary.

Figure 6:
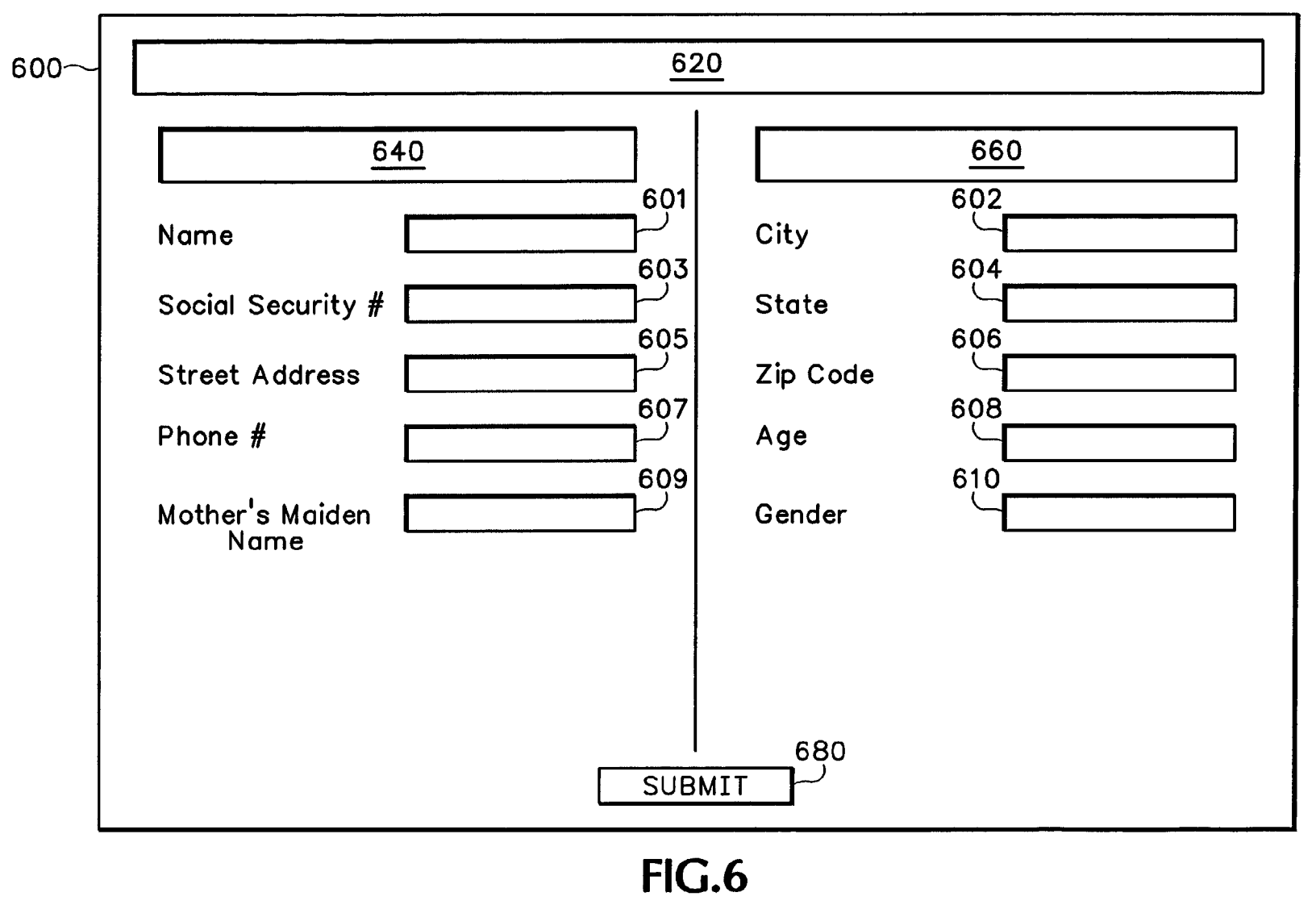

FIG. 6 is an illustration of a computer generated display seen by the consumer when applying for a financial product. In this embodiment, the intermediary is a computer system that automatically accepts consumer applications input from a personal computer connected to the computer system with a network connection.

A display area 600 of the personal computer, laptop computer, or personal digital assistant includes an area 620 for identifying the intermediary by name or for other advertisement purposes. A submit button 680 allows the consumer to submit their application. Areas 640 and 660 identify what the submitted information will be used for. For example, area 640 contains a written statement telling the consumer that the information input into odd-numbered data entry blocks 601, 603, 605, 607, and 609 will be used to request the consumer's credit information from a credit bureau. Area 660 contains a written statement indicating that the information input into even-numbered data entry blocks 602, 604, 606, 608, and 610 is used to request the consumer's credit information from a credit bureau and is supplied to suppliers of financial products and services.

The information in the odd-numbered data entry blocks 601-609 forms data set 501 of FIG. 5, the information that uniquely identifies the consumer. The even-numbered data entry blocks 602-610 form the data set 502 from FIG. 5 that is not unique to the consumer. In this embodiment, the consumer places a cursor in the data-entry blocks 601-610 and inputs the information requested. In this case the requested data is indicated to the left of the data entry blocks 601-610 as shown in FIG. 6.

Odd-numbered data entry blocks 601, 603, 605, 607, and 609 correspond to name, social security number, street address, phone number, and mother's maiden name, respectively. Likewise, even-numbered data entry blocks 602, 604, 606, 608, and 610 correspond to the consumer's city, state, zip code, age, and gender. Of course, the specific information required in an application may be different depending on the financial product or service requested.

Figure 7:
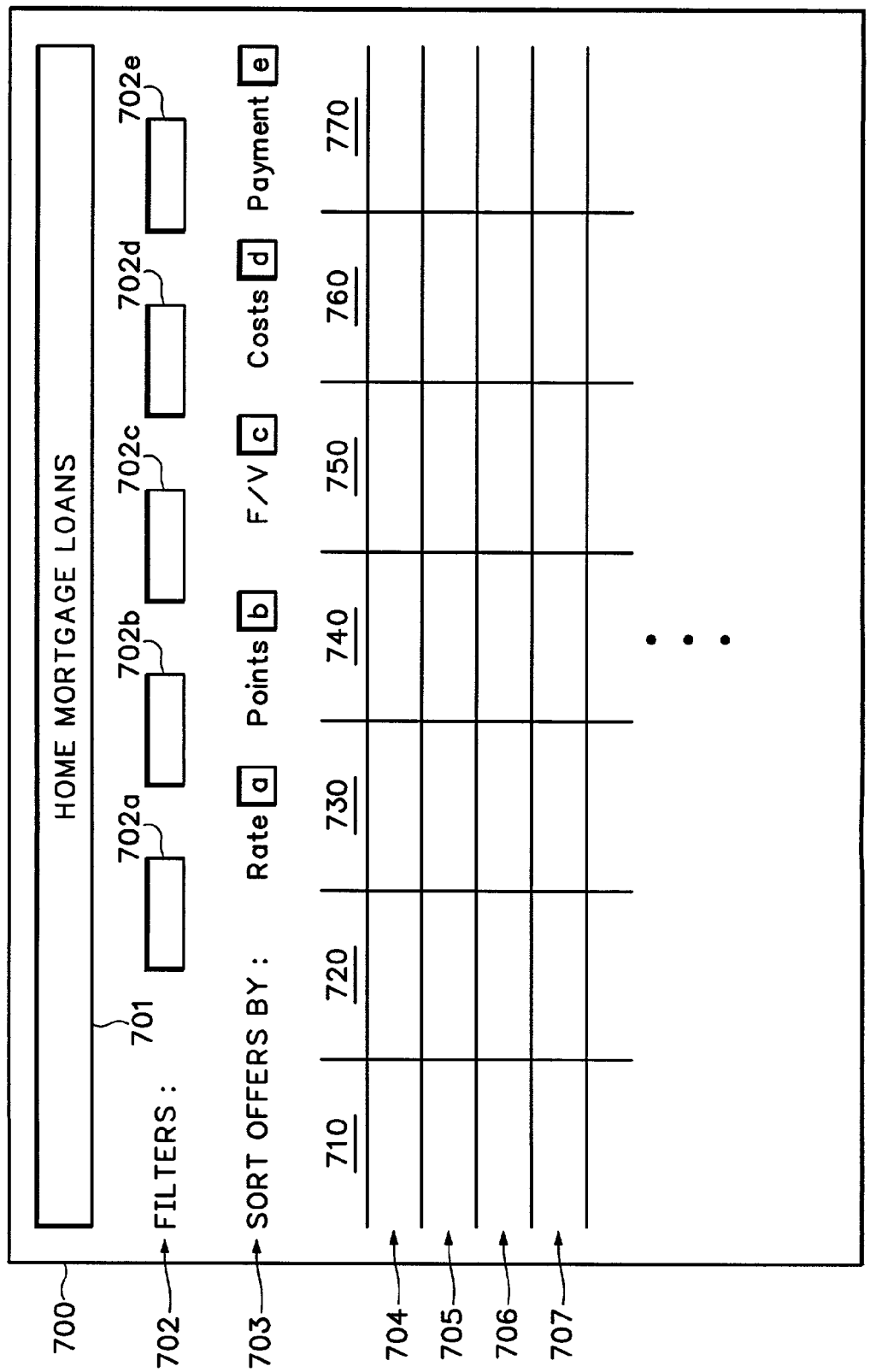
FIG. 7 is an illustration of a computer display seen by the consumer when comparing offers for financial products.

Once the consumer has applied for a product and the intermediary has created an anonymous profile for the consumer, there must be a way for the consumer to compare received offers. FIG. 7 is an illustration of a computer generated display seen by the consumer when comparing the offers for a financial product according to one embodiment. In this embodiment, the intermediary is a computer system that automatically collects offers from suppliers connected to the system with a network connection and displays the entirety of the offers made to a consumer via a consumer home page.

A computer-generated display area 700 of a personal computer, laptop computer, or personal digital assistant displays information 701 to the consumer about what type of offers are being displayed, for example, home mortgage loans, auto loans, credit card offers, etc. In this embodiment the type of offer displayed is a home mortgage loan. There are a plurality of rows 704, 705, 706, 707, etc, where each row contains information about one offer. There are as many rows as necessary to display all offers, and if required the consumer can "scroll down" to view the rest of the offers.

Columns 710-770 contain information regarding certain characteristics of each offer. In this embodiment, columns 710, 720, 730, 740, 750, 760, and 770 represent the expiration date of the offer, the rate of the offer, the points of the offer, whether the offer is fixed or variable, the closing costs of the offer, the amount of the principle+interest payment, and the lender, respectively. In this embodiment of the present invention, column 770 contains hyperlinks which allow the consumer to connect to electronic files comprising a part of the offer or other electronic files contained in other systems and receive more detailed information about the product offer.

Row 702 contains data entry blocks 702a-702e, corresponding to columns 720-760, respectively, where the consumer indicates cut-off values or filters for displayed offers. For example, if the consumer wishes to see only those offers that have a rate better than 8.5%, then he would enter that value into data entry block 702a. None or all of data entry blocks 702a-702e contain cut-off values, depending on the consumer's wishes at the time. Similarly, row 703 contains blocks a through e, corresponding to columns 720-760, respectively, where the consumer indicates how the data in rows 704-707 et al. is sorted. For example, if the consumer wished to sort the offers by best rate, he would select block a in row 703. Unlike the data entry blocks in row 702, only one of the blocks a through e in row 703 can be selected at any one time.

There are a variety of views similar to the one described in FIG. 7 for each of the products desired by the consumer. Additionally, the number of columns and the type of information contained in each column varies depending on the type of product offers displayed. For example, there is no closing cost associated with a credit card offer, but there might be a required annual fee.

FIG. 7 is an example of how the intermediary provides information about offers to the consumer regarding new accounts, but one embodiment of the present invention also allows the consumer to receive offers for existing accounts. For example, if the consumer is unhappy with a present credit card provider, the intermediary can accept information from the consumer about the present account and solicit offers on the consumer's behalf for replacement services.

Consumers may also receive offers for aggregate services. For example, the consumer might wish to consolidate their accounts with a single multi-product supplier for convenience reasons or to take advantage of better offers presented by suppliers to consumers with multiple accounts, or relationship rates. In this embodiment, the consumer indicates to the intermediary which accounts he wishes to aggregate, allowing the intermediary to display such information in the consumer's anonymous profile so that suppliers looking for aggregate consumers can make an offer.

Figure 8:
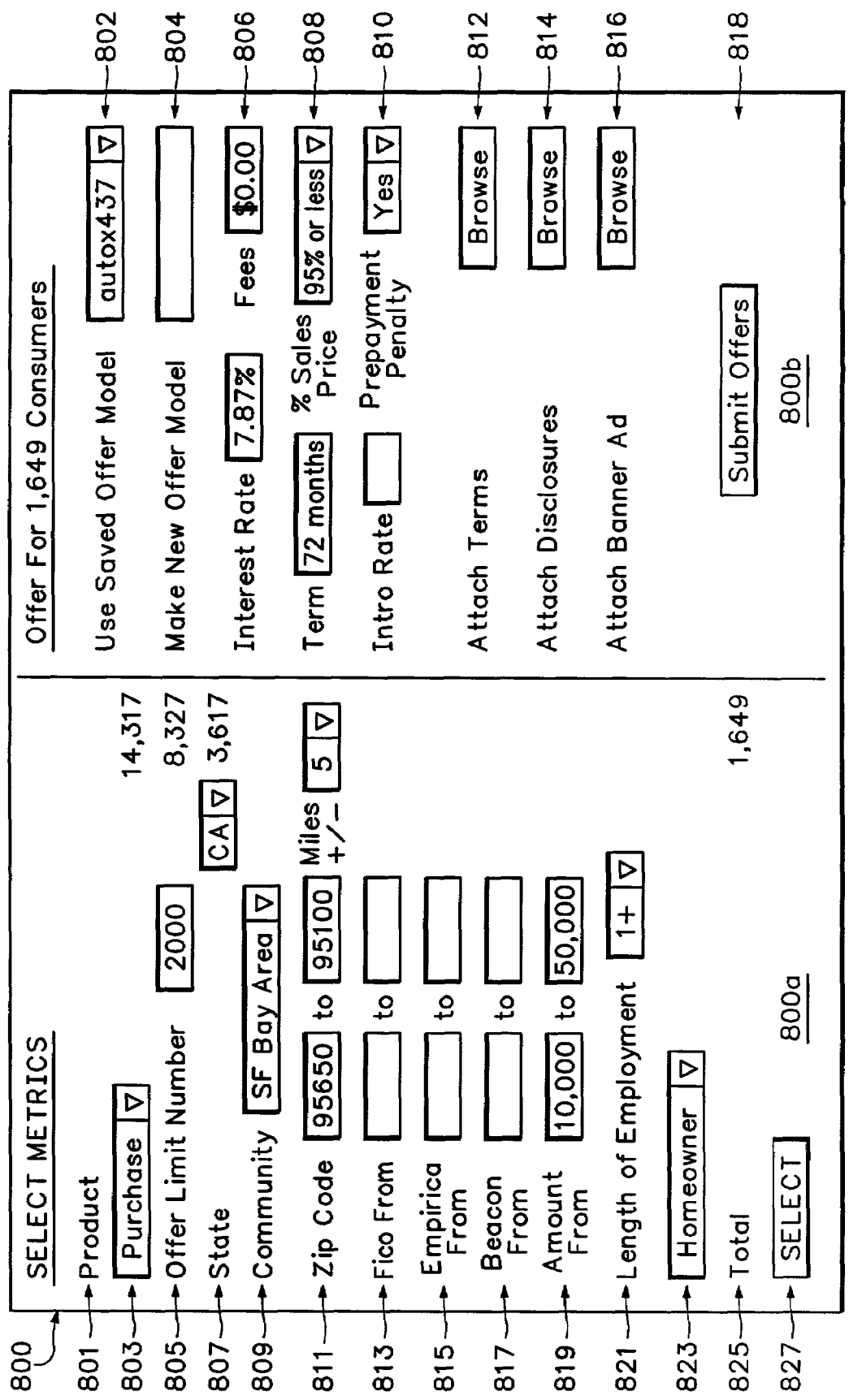
FIG. 8 is an illustration of a computer generated display seen by the supplier when sorting and grouping anonymous consumer profiles in order to arrive at a selected subset of consumers.

While the consumer advantages described above are substantial, suppliers of financial services are also able to easily make offers to a selected subset of consumers with a desired credit risk. The intermediary is a computer system that automatically generates an anonymous consumer profile containing the consumer's credit report and provides tools to the supplier to allow them to sort and group consumers according to information contained in the anonymous consumer profile. In this embodiment, a network of suppliers is connected to the intermediary with network connection devices, and each supplier is provided a supplier home page. FIG. 8 is an illustration of a computer generated display 800 seen by the supplier when sorting and grouping anonymous consumer profiles in order to arrive at a selected subset of consumers.

The computer-generated display 800 of a personal computer, laptop computer, or personal digital assistant is divided into two halves, denoted by area 800a and area 800b. Odd numbered lines in FIG. 8 refer to elements in 800a while even numbered lines refer to elements in 800b. Area 800a is where the supplier specifies a desired subset of consumers. Line 801 indicates the product that the supplier is offering, in this case an auto loan, and the number to the right of that indicates the number of consumers who have requested offers for that product. On line 803 there is a data entry block where either lease or purchase is specified, on the right side is the number of consumers who desired to purchase rather than lease an auto.

The data entry block on line 805 allows the supplier to specify the maximum number of consumers who are made an offer. Line 807 contains a data entry block for the state of residence, line 809 allows the supplier to further limit the residence area within the state, and line 811 allows the supplier to specify specific zip codes for desired consumers. Line 807 also indicates the number of consumers who have met the specified criteria up to that point. Lines 813, 815, and 817 contain data entry blocks that are used to specify ranges of information typically found on a consumer's credit report. Line 819 is used to enter the amount of the offer.

The length of the desired consumer's employment is input into data entry block on line 821, and whether the consumer rents or owns a home is input in line 823. The information entered in lines 801-823 is continually matched with the anonymous profiles of consumers who use the intermediary system, and the number of consumers who fit the specified criteria is output on line 825. The supplier can adjust these figures at any time, and when the desired subset of consumers is found, the "select" button on line 827 is selected, thus indicating that the desired subset of consumers has been found.

Once the desired subset of consumers is specified, the supplier uses the elements in area 800b to select the offer that is made to the consumers. In line 802, the data entry block allows the supplier to choose from among a variety of previously used offers. If a new offer is being developed, the data entry block on line 804 allows the supplier to enter the offer into the existing library of offers. The supplier specifies the interest rate and fees associated with the offer on line 806.

The data entry blocks on line 808 are for the term of the loan and the maximum amount of the sales price that will be financed. Line 810 allows the supplier to specify if there is an introductory interest rate or if a prepayment penalty exists. The browse buttons on lines 812, 814, and 816 are used to choose pre-composed terms, disclosures, and advertisements to place with the offer. The "submit offers" button on line 818 is selected when all the specifics of the offer are finalized. After the supplier submits the offer, the intermediary forwards the offer to the consumer whose profile that the supplier has selected.

ATS Application

The risk-based services can be distributed through the Internet, world-wide web, wireless, mobile positioning wireless, local wireless, 802.11, Bluetooth, WAP, bid exchange, marketplace, applications, database, retail, commercial, application service provider. Some of the businesses that can use the ATS can include financial services, credit cards, asset purchase, asset auction, medical insurance, medical services, life insurance, auto insurance, auto leasing, business loans, business leasing, dating services, retail, commercial, application service provider, etc. Other applications can include advertising services and dating services.

An ATS, distributor or multiple levels of distributors can determine consumers they will provide the risk-based services to, the products their consumers will be permitted to request offers for, the suppliers who may make offers to their consumers, the fee they will charge suppliers for making offers to their consumer, the fee they will charge suppliers for receiving acceptances from their consumers, maximum supplier charged interest rates and fees for products, minimum supplier paid interest rates for products, etc.

The ATS, distributors or multiple levels of distributors may set offer fees based on the competitive ranking of the offer relative to other offers transmitted to consumers at the same time. Competitive ranking may be based on criteria pre-established by the ATS, the distributor or the consumer or may be modified by the consumer prior to transmission of an anonymous transaction profile to processors or after receiving offers.

Offer fees may be set based in part on the amount of offer content provided by the supplier and/or on the amount of offer content viewed by the consumer. All products may be selected to be available through the ATS to their consumers or specific products to offer or specific products to exclude can be selected based on any criteria.

The ATS, distributors or multiple levels of distributors may supply products directly to consumers, may provide products from third-party suppliers directly to consumers or may permit third-party suppliers to provide product directly to their consumers and may select to offer only those products available through the ATS system that they themselves or their third-party suppliers do not supply directly.

The ATS, distributors or multiple levels of distributors may select to have all suppliers available through the centralized system make offers to their consumers or may select specific suppliers or exclude specific suppliers based on any criteria. Suppliers can also be selected based on the vicinity of the supplier offices to the requestor. However, suppliers can also be selected not having offices near to the distributor offices or the offices of third-party suppliers.

The ATS, distributors or multiple levels of distributors may be notified when new suppliers are entered into the system and may be provided with options to select or exclude the new suppliers. Maximum supplier charged interest rates and fees can be selected based on any criteria, including determination of predatory or high-cost interest rates, fees, costs, loans and credit.

Figure 9:
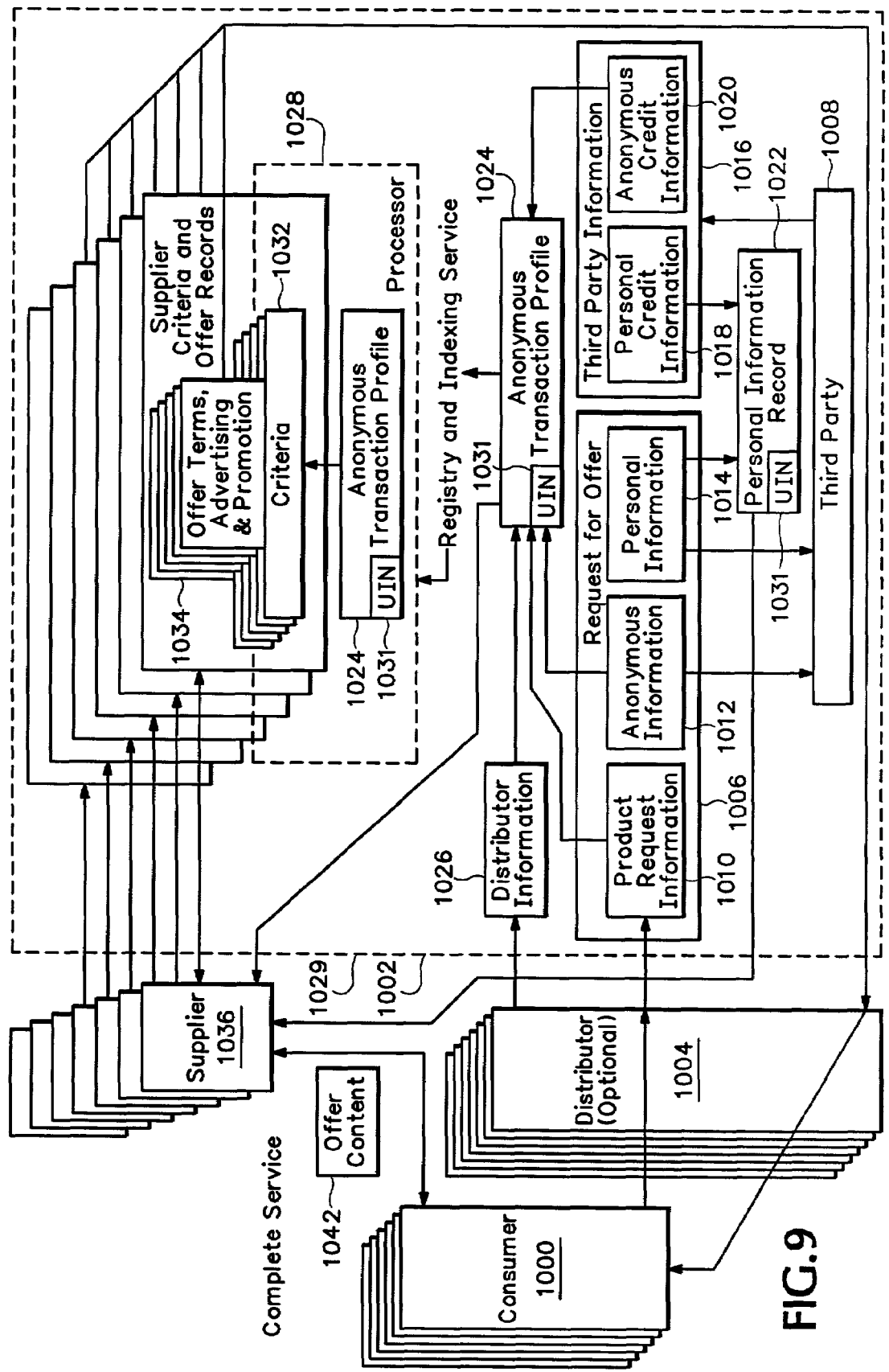
FIG. 9 is a block diagram of the ATS used for multiple consumers and distributors.

FIG. 9 shows a complete service configuration for the Anonymous Transaction Service (ATS) 1002. Consumers or small business principles 1000 are referred to generally as "consumers." Consumers 1000 requesting product offers can access the ATS 1002 directly or through one or more distributors 1004. Consumers 1000 complete a request for offer 1006 based on the options established by the ATS 1002.

An intermediary or distributors 1004 can manage the process on behalf of the consumer 1000; completing the request for offer 1006, receiving and evaluating offers 1034, accepting an offer on behalf of the consumer 1000, and working directly with a third-party supplier, such as credit bureau 1008 to complete the transaction.

The request for offer 1006 contains one or more product request(s) 1010, personal information 1014 and anonymous information 1012. The personal information 1014 and anonymous information 1012 in the request for offer 1006 may include any combination of name, address, Social Security Number, driver's license number, email address, whether the consumer is a homeowner or a renter, years at current residence, employment status, ability to document income, years at current employment status or with current employer.

The anonymous information 1012 and personal information 1014 may contain demographic, business and employment information specifically required to qualify a consumer for a service and to risk-base price the service and personal information necessary to obtain the third-party information, such as a credit report 1016 for the consumer 1000.

Consumers 1000 can elect to receive offers only from suppliers 1036 with local offices, suppliers 1036 having preexisting relationships with the consumer 1000, or new suppliers 1036. The consumer 1000 can select values for specific offer criteria so that when an offer submitted by a supplier 1036 that meets selected criteria 1032, the consumer 1000 is notified by email.

The consumer 1000 agrees to release their personal and anonymous information. The ATS 1002 uses the personal information 1014 and the anonymous information 1012 to request third party information 1016 for the consumer 1000. The ATS 1002 saves third party information 1016 for every instance where the consumer 1000 agrees to release their personal and/or anonymous information and that information is transmitted to a supplier.

The third party 1008 in the ATS 1002 can be any business providing a report. For example, the third-party 1008 may be a credit bureau providing a credit report. The third party 1008 may be a government department of motor vehicles or government department of transportation providing a record of a driver's qualifications, test results or driver history. The third-party may be a government department of motor vehicles or government department of transportation providing a record of a small business vehicle inspection, test, accident and citation history.

Another third-party example is an auto insurance company providing a consumer citation, accident or claims history; a health insurance company providing medical record services; or a medical services provider providing a record of personal doctor visits, diagnoses, medical services and procedures obtained, symptoms, observations, recommendations and referrals.

In another example, the third-party 1008 is a government law or regulatory enforcement agency, government intelligence agency, government judiciary agency, government prison or rehabilitation service, government or non-government criminal or judicial record service or a clearing house or private investigation agencies providing records of personal or small business criminal acts, regulatory violations, criminal or enforcement charges, judiciary proceedings and rulings or outcomes, prison or rehabilitation services records or other behaviors, acts or suspected acts of any type or nature.

The third-party 1008 provides third-party information 1016. The personal information 1018 supplied by the third-party 1008 includes information that identifies a specific consumer 1000, such as an individual, family or business. For example, the personal information 1018 can include, but is not limited to, name, address, phone number, identifying numbers, URI, URL, credit account numbers, insurance policy numbers, insurance claim numbers, judgment and court proceeding case names and numbers, specific claim information, specific medical procedure information, etc.

The anonymous information 1020 supplied by the third-party 1008 is information specific to the consumer 1000, or the consumer's family, but cannot reasonably and normally be used to identify a specific person, family or business. Examples of anonymous information 1020 can include credit score, amount of credit extended by credit-granting agencies, amount of credit used, late payment information, number of driving accidents, number of points on drivers license, etc.

The ATS 1002 merges distributor information 1026, product request(s) 1010, anonymous information 1012, and anonymous third-party information 1020 and creates an Anonymous Transaction Profile (ATP) record 1024. The anonymous transaction profile 1024 includes a Unique Identification Number (UIN) 1031. The identification number 1031 may be a digital certificate number issued by a certificating authority or certificating authorities that can be verified and authenticated.

An intermediary or distributors 1004 can view multiple ATPs 1024, sort the ATPs, compile the profile information, and summarize the information, etc. for data-mining. The consumer 1000 can use their ATP 1024 to request one or more products or services. The consumer 1000 can update their anonymous transaction profile 1024 in the future. Existing information that does not need to be changed can be saved along with newly entered information.

The ATP 1024 is extensible. Additional information necessary to receive offers for future products can be added to the existing saved information without reentering information previously entered and saved. New anonymous third-party information 1016 can be saved to the ATP 1024. The anonymous transaction profile 1024 may be saved without transmitting the anonymous transaction profile to a processor.

The ATS 1002 merges the personal request for offer information 1014 and personal third-party information 1018 into a personal information record 1022. The personal information record 1022 includes the same Unique Identification Number (UIN) 1031 as the ATP 1024. The identification number 1031 may be a digital certificate number issued by a certificating authority that can be verified and authenticated. The personal information record 1022 can be encrypted so only the consumer 1000 can decrypt the information. The consumer 1000 can update their personal information record 1022 in the future and existing information that does not need to be changed can be saved with newly entered information.

Processing Anonymous Transaction Profiles (ATPs)

The suppliers 1036 create criteria record 1032 containing requirements the data in the ATP 1024 must meet. Examples of criteria are shown above in FIG. 8. Offers 1034 are extended to consumers 1000 with ATPs 1024 matching the criteria 1032. All other ATPs 1024 will not be matched with offers.

Suppliers 1036 use pre-set values, tables, criteria or analytical models to calculate offer terms and conditions and contents based on values in the ATP 1024. The modeling may include criteria 1032 that must be met before being matched with any offer. A matching engine is a table that includes all the criteria for a consumer and the criteria for an offer. For example, the criteria in the table may specify that a credit score for a consumer between 700 and 720 then a mortgage rate offer will be sent at 7.1%. A modeling engine may take whatever the credit score is and use a logical, statistical, algebraic or other mathematical algorithm to derive a mortgage rate to be supplied in the offer.

Manual processing can also be used to determine what offers are sent, if any, to consumers 1000 based on their ATPs 1024. Suppliers 1036 use ad-hoc or pre-established rules to create a process that is manually applied for accepting and saving ATPs 1024 for evaluation, processing, and determining if an offer will be provided and the terms, conditions and contents of the offer.

Suppliers 1036 can use one set of criteria 1032 to segment and target existing consumers 1000 who are shopping for new products and use another set of criteria 1032 for segmenting and targeting new consumers who are shopping for new products. Another set of criteria 1032 can be used for segmenting and targeting relationship rate opportunities for consumers requesting two or more products. Suppliers 1036 can cross-sell additional products to consumers 1000 who already have one or more products from the same supplier 1036. Cross-sell products may have yet another different set of criteria 1032.

Suppliers can differentially price offers 1034 based on the calculated risk of a consumer 1000 having an ATP 1024 meeting specific demographic criteria, business criteria, employment criteria, historical credit criteria, historical driving record criteria, historical medical criteria, etc. Offers 1034 can include terms and conditions of the service and other content. Sample offers are shown in FIG. 7. Terms and conditions may include value, contract documents, disclosures, rate, points, payment terms, etc. Content may include company information, community relations information, local offices, corporate sponsorships and application forms and may be in the form of text, graphics, video, audio, etc.

Suppliers 1036 can compare the terms and conditions of their offers 1034 with the terms and conditions of other supplier offers to the same consumers 1000. Suppliers 1036 can modify the criteria 1032 and terms of offers 1034 to improve the competitiveness of their offers with other supplier offers.

Supplier Selected Distributors

Suppliers 1036 can select distributors 1004 and process requests for consumers 1000 associated with those distributors using any criteria 1034. Suppliers 1036 can select or exclude distributors 1004 according to the location the distributor in relation to the supplier locations. Suppliers 1036 can exclude distributors 1004 based on products supplied by the distributor or supplied by third parties through the distributor. Suppliers 1036 can be notified when new distributors 1004 are added to the ATS 1002 and are provided with options to select or exclude the new distributors.

Suppliers 1036 select criteria 1032 for the maximum distribution costs for each offer or offer acceptance. Consumers 1000 using distributors charging in excess of the supplier's maximum distribution costs may not be matched for presenting offers. Suppliers 1036 can also limit the number of offers made to consumers 1000 and limit the number of acceptances they receive for any one offer.

The ATS 1002 and other registry and indexing services may charge fees to consumers, distributors, and suppliers for each offer request 1006, saving an offer request, requesting a credit report, receiving a credit report, creating an anonymous transaction profile 1024, saving an anonymous transaction profile, saving a personal information record 1022, transmitting an anonymous transaction profile to a processor, transmitting an anonymous transaction profile to multiple processors, creating supplier criteria 1032 and offer record, transmitting an offer 1034, or transmitting a consumer acceptance and entry into a registry service. The fees may be set based on any criteria including consumer type, product type, distributor type, supplier type, volume of any type, product price, competitive ranking, etc.

Figure 10:
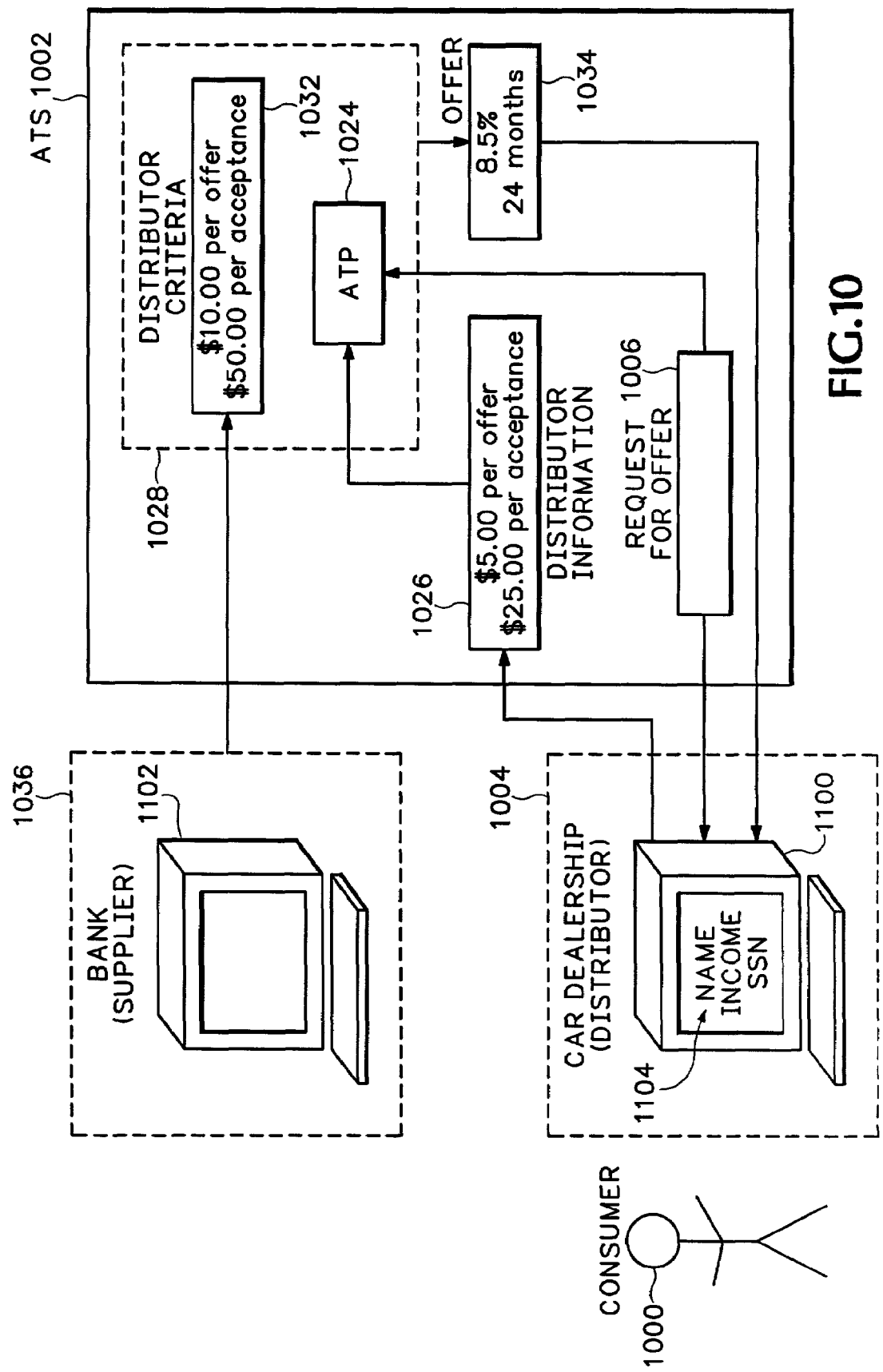
FIG. 10 is a diagram showing how offers are initiated based on distributor costs.

One example of distributor criteria is shown in FIG. 10. A consumer 1000 wishes to purchase a car at a car dealership. The car dealership operates as a distributor 1004 of financial services for a supplier 1036. The supplier in this example is a bank that services car loans. The car dealership 1004 has a computer 1100 that connects to the ATS 1002. The car dealership 1004 enters the personal information 1104 of the consumer 1000 and generates a request for offer 1006.

Either proceeding or at the same time the request for offer 1006 is submitted to the ATS 1002, the car dealership 1004 submits distributor information 1026 to the ATS 1002. The distributor information 1026 identifies any distribution charges charged by the car dealership 1004. In this example, the car dealership is charging $5.00 for each offer submitted to the consumer 1000 and $25.00 for any offer accepted by a consumer 1000. The distributor information 1026 and the request for offer 1006 is assembled into an ATP 1024.

The bank 1036 includes a computer 1102 that is connected to the ATS 1002. The bank submits criteria 1032 for making offers. In addition to consumer criteria, such as credit rating, annual income, etc., the criteria includes distributor charge criteria as shown in criteria 1032. The distributor criteria specifies a maximum distributor offer charge of $10.00 and a maximum distributor offer acceptance charge of $50.00. A processor 1028 in the ATS 1002 compares the criteria 1032 with the ATP 1024.

Since the car dealership charges are less than the banks maximum distributor criteria, the processor 1028 can generate an offer 1034 to the consumer 1000 through the car dealership 1004. That is assuming, the other personal information in the ATP 1024 also meets any other bank criteria 1032. The offer 1034 is sent back to the computer 1100 at the car dealership. The car dealership then receives a $5.00 charge from the bank 1030. If the consumer 1000 accepts the offer 1034, the car dealership 1004 then charges the bank 1036 an additional $25.00.

Referring back to FIG. 9, continuous matching, continuous modeling or manual processing can be used for processing the ATP 1024. The criteria and offer terms and content of an existing offer 1034 can then be changed. Suppliers 1036 can modify a saved offer 1034 and use the modified offer 1034 to automatically process the ATPs 1024.

The ATP 1024 is transmitted to one or more processors 1028. In one example a processor is a server, computer, central processing unit, etc. that's used for the modeling or matching engine. In another example, the processor is a human that manually conducts the matching between the ATPs 1024 and the criteria 1032. There may be separate processors 1028 used by different suppliers and intermediaries or the same processor 1028 may be used by one or more suppliers 1036. For example, the processor 1028 may be used by one or more clearinghouses that contain the processing models for one or more suppliers 1036. The same processor 1028 may service one or more suppliers 1036 and one or more clearinghouses.

The ATP 1024 may be directed to processors 1028 using one or more registry services 1040 shown below in FIGS. 16 and 17. The registry service 1040 includes criteria determining which ATPs 1024 are transmitted to which processors 1028. The indexing service 1040 may record the number and details of transmitted ATPs 1024, the processor 1028 each ATP 1024 is transmitted to, etc.

Consumers 1000 can access the ATS 1002 to transmit the previously created ATPs 1024 to one or more processors 1028. The ATPs 1024 may be transmitted once or may be automatically transmitted on a regular or irregular basis as established by the consumer 1000, the distributor 1004, or the ATS 1002. The ATP 1024 can be transmitted via a dial-up connection, the Internet, Wide Area Network (WAN) connection, private network, or virtual private network.

Offers

The offers 1034, however created, are delivered to the consumer 1000. The offers 1034 may include terms and conditions and content as previously shown in FIG. 7. Consumers 1000 review the offer or offers, sort the offers using different offer criteria to display the offers ranked relative to one another, compare multiple offers and conduct additional research using resources of the ATS 1002 or other systems.

The offers 1034 can be transmitted to the consumers 1000 via a dial-up connection, Internet, wide area network connection, private network, or virtual private network. The registry service 1040 (FIGS. 11-14) may contain criteria determining which offers 1034 are transmitted to the ATS 1002, distributors 1004 or multiple levels of distributors.

An indexing service 1040 (FIG. 16) may record the number and details of offers transmitted and where each offer was transmitted. The terms and conditions of an offer for a new product to replace an existing product may be displayed along side the terms and conditions of the existing product. The terms and conditions of an offer may be displayed along side a status report for an existing product, including an account balance, account fees, etc. By placing the terms and conditions of current and new products side-by-side, the consumer can calculate or display additional costs, savings or profits by selecting alternative products.

Offer terms and conditions and content can be saved for later viewing or comparison. The ATS 1002 and distributors 1004 can view individual and aggregated offer information for requestors and suppliers. The aggregated offer information can be viewed for consumers 1000, suppliers 1036 and distributors 1004.

When an offer is accepted, the qualifying consumer 1000 agrees to release their ATP 1024 and personal information record 1022 to the selected supplier 1036 and requests an application to apply for the product. Consumers 1000 download any offer content 1042 necessary for completing the transaction directly with the supplier 1036.

The ATS 1002 saves information for every instance where the consumer agrees to release their personal or anonymous information. The consumer 1000 may view a list recording every time they agreed to release their personal or anonymous information. The consumer can save the terms and conditions and contents of accepted offers. The ATS 1002 or distributors 1004 can view individual and aggregated offer acceptance information for consumers and suppliers. Aggregated offer acceptance information can be viewed for consumers 1000 and suppliers 1036 to determine the impact of fee structures on the number of offer acceptances suppliers receive or the number of acceptances made by consumers 1000.

Personal Information Record Security

The Personal Information Record (PIR) 1022 is identified by a Unique Identification Number (UIN) 1031. The ATS 1002 may assign UINs 1031 to any new PIR 1022. Personal information in the PIR 1022 may be stored in an encrypted format using a standard encryption program. The PIR 1022 may be encrypted using the consumer password and/or login as a private key in a multiple-key encryption system.

The consumer password used for accessing the ATS 1002 can also be used to generate a private key using a mathematical algorithm in a multiple-key encryption system. Any combination of the UIN 1031, user password and login are passed through a number generator to generate a unique number. This generated number is then used as a private key for encrypting and decrypting the PIR 1022.

The consumer 1000 enables a supplier to obtain the PIR 1022 by giving the supplier 1036 the consumer password and login. The supplier 1036 then supplies the password, login and UIN 1031 to the ATS 1002. The ATS 1002 uses this information to regenerate the unique number that is used as the private key for decrypting the consumers PIR 1022. Encrypting the PIR information 1022 prevents unauthorized personnel from unauthorized access to consumer PIRs 1022.

Users can view analytical information from the ATS system 1002 including historical market pricing data, last transaction data (transaction ticker), real time market pricing data for offers to selected requestor segments, real time market pricing data for accepted supplier offers, real time market data for requests for offers including the type and conditions of the product and anonymous transaction profile information. Consumer behavioral data can also be viewed including information indicating how consumers look at offers, sort offers, view offer details, view offer promotions, save offers, etc.

Consumers 1000 complete an application providing personal, demographic, business and employment information. The supplier 1036 processes the complete application to ensure the information meets the qualifications for the product and the risk-based pricing. Suppliers 1036 may obtain another consumer credit report 1016 before completing the application, documentation and loan or credit process with the consumer 1000.

The consumer 1000 remains anonymous through the offer phase of the process where the offer 1034 is sent back to the consumer 1000. This ensures that only anonymous consumer information 1010, 1012 and 1020 is presented to the suppliers 1036. This reduces the risk of identity theft and personal information disclosure.

Alternative ATS Configurations

FIGS. 9-21 show different configurations for the ATS 1002. FIG. 9 shows a complete services configuration. In the complete services configuration the creation of requests for offer 1006, third party information 1016 and ATPs 1024 are performed by an intermediary.

In one example, the intermediary is one or more centralized servers operated by an independent ATS service provider. The intermediary 1029 also compares the ATPs 1024 with criteria 1032, and generates offers 1034 to consumers 1000. The consumer 1000 interacts directly with the intermediary 1029 or through a distributor 1004 that provides an interface to the ATS 1002 operated by the intermediary 1029.

Figure 11:
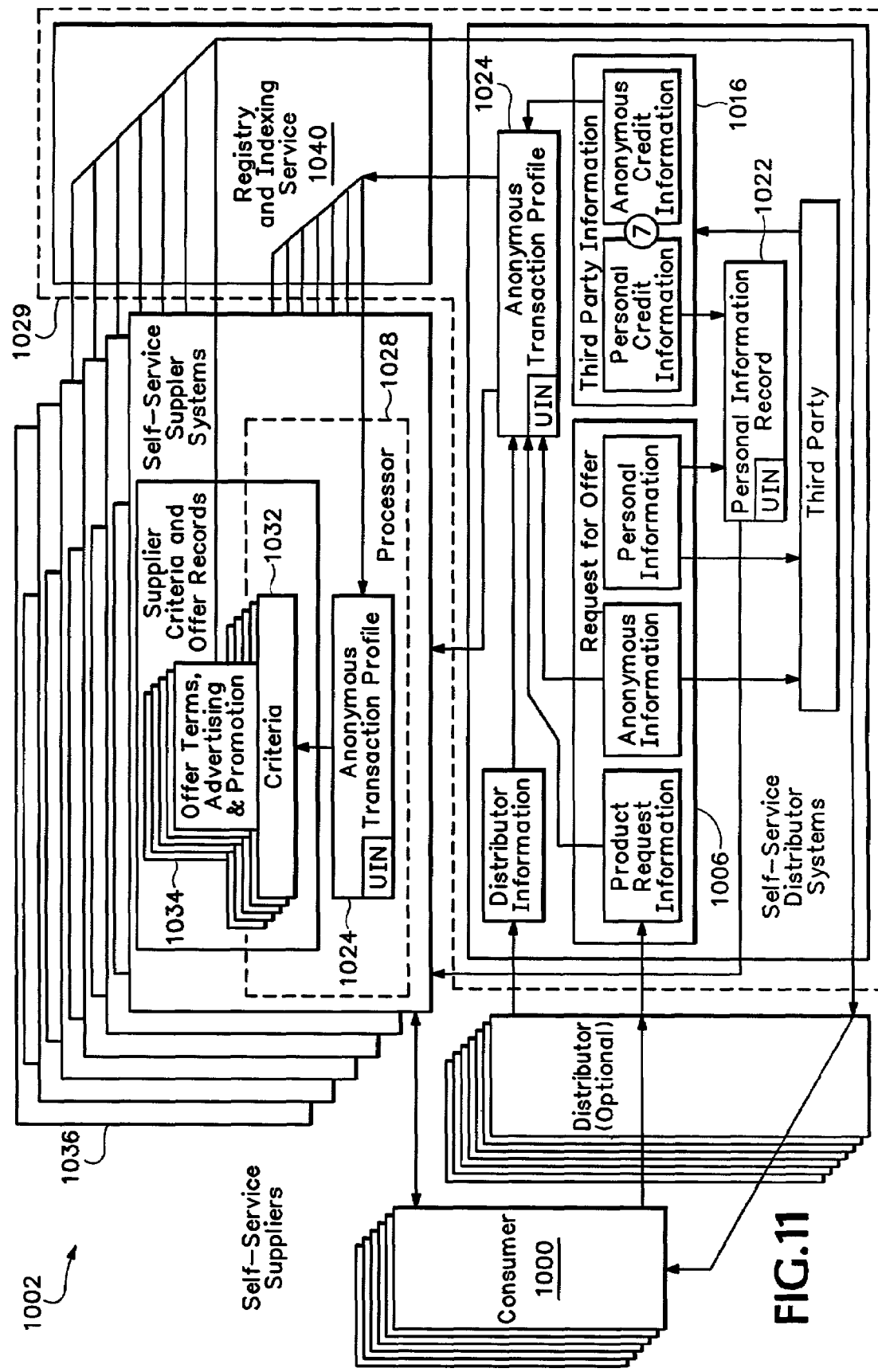
FIG. 11 is a block diagram showing how the ATS is used for self-service suppliers.

FIG. 11 shows a self-service supplier configuration for the ATS 1002 where the suppliers 1036 operate processors 1028 that receive the personal information records 1022 for the consumers, the ATPs 1024, and generate offer terms advertising and promotional material 1034. An intermediary 1029 provides registry and indexing services 1040 and assembles the ATPs 1024 from the request for offer 1006 and third party information 1016.

Figure 12:
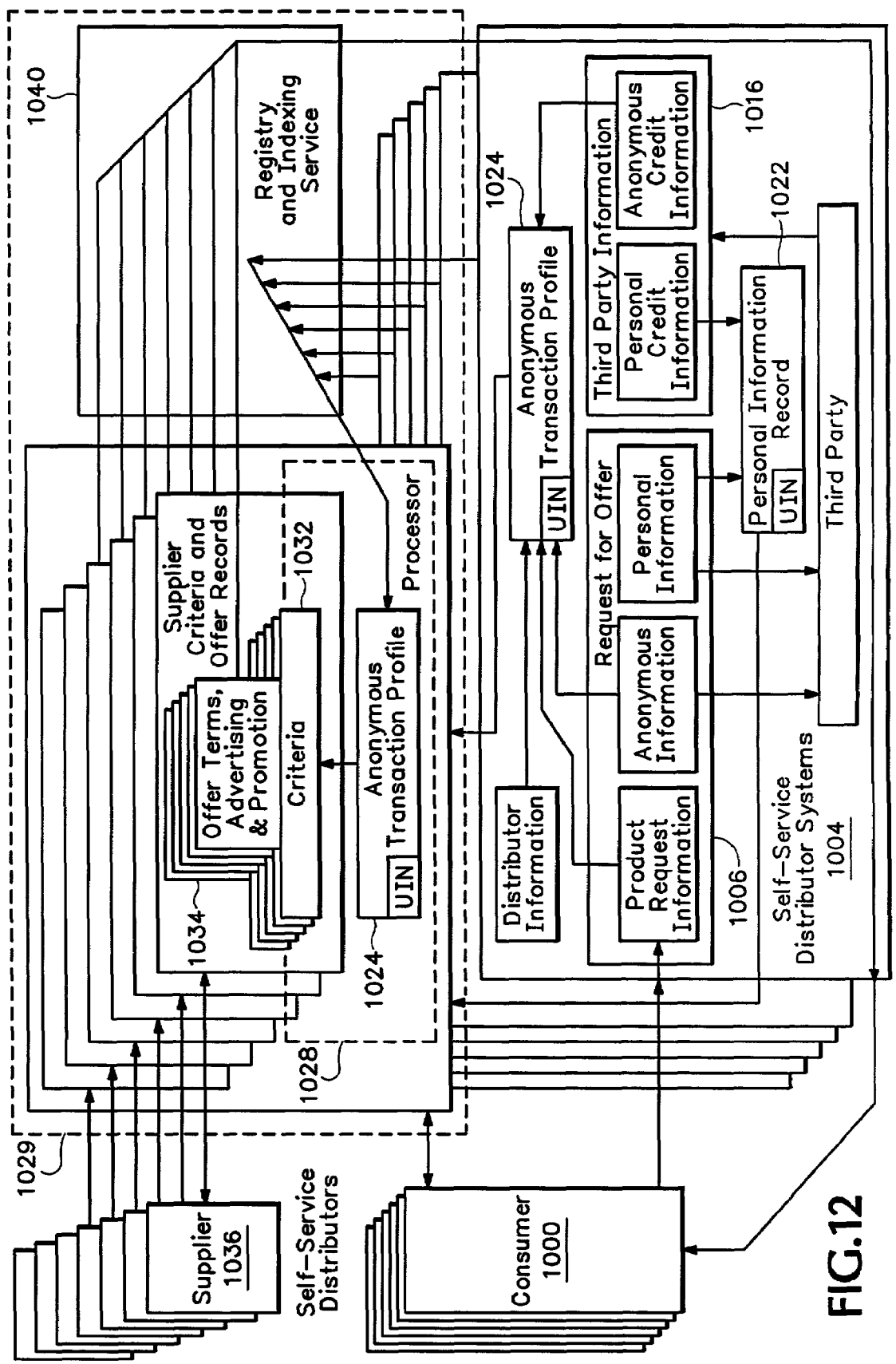
FIG. 12 is a block diagram showing how the ATS is used with self-service distributors.

FIG. 12 shows a self-service distributor configuration where the distributor 1004 receives request for offers 1006 from consumers 1000, generates third party reports 1016, and generates the ATPs 1024. An intermediary 1029 provides the registry and indexing service 1040 and compares the ATPs 1024 with criteria 1032 using processor 1028. The intermediary 1029 also sends out the offers 1034 though the registry and indexing service 1040 to the self-service distributor systems 1004.

Figure 13:
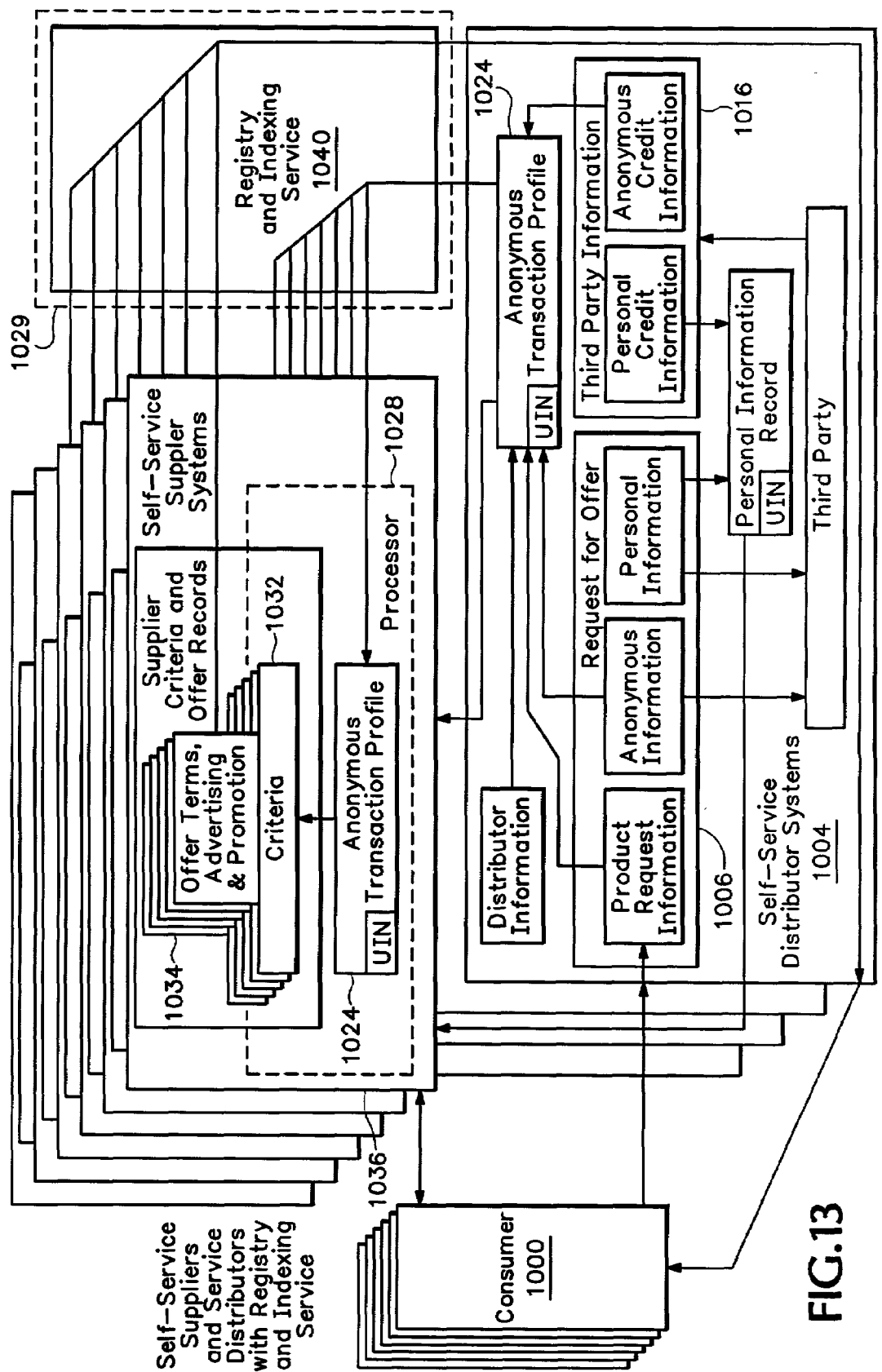
FIG. 13 is a block diagram showing how the ATS is used for self-service suppliers and self-service distributors with registry and indexing services.
Figure 14:
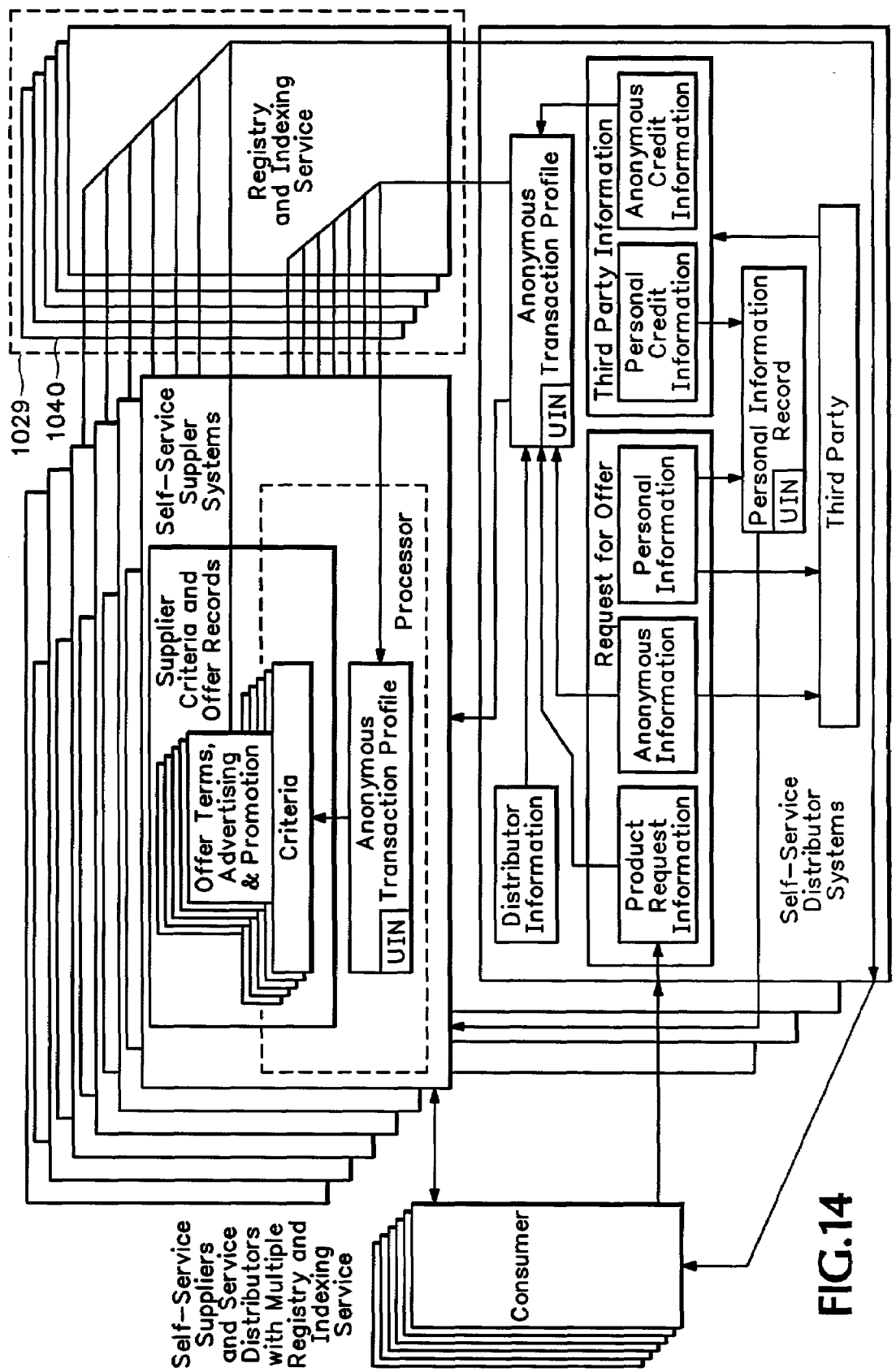
FIG. 14 is a block diagram showing how the ATS is used with self-service suppliers, self-service distributors and multiple registry and indexing services.

FIG. 13 shows a self-service supplier and self-service distributor configuration with an intermediary 1029 operating only the registry and indexing service 1040. Self-service suppliers 1036 include computers that compare the ATPs 1024 with the criteria 1032 and send out offers 1034 to qualifying consumers 1000. The distributors 1004 operate computers that receive the request for offers 1006 and assemble the ATPs 1024. The self-service suppliers 1036 and the self-service distributors 1004 are linked together with the registry and indexing services 1040 provided by a computer system operated by the intermediary 1029. The configuration in FIG. 14 is the same as the configuration shown in FIG. 13, however multiple registry and indexing services 1040 are operated by one or more intermediaries 1029.

Registry and Indexing Services

Figure 16:
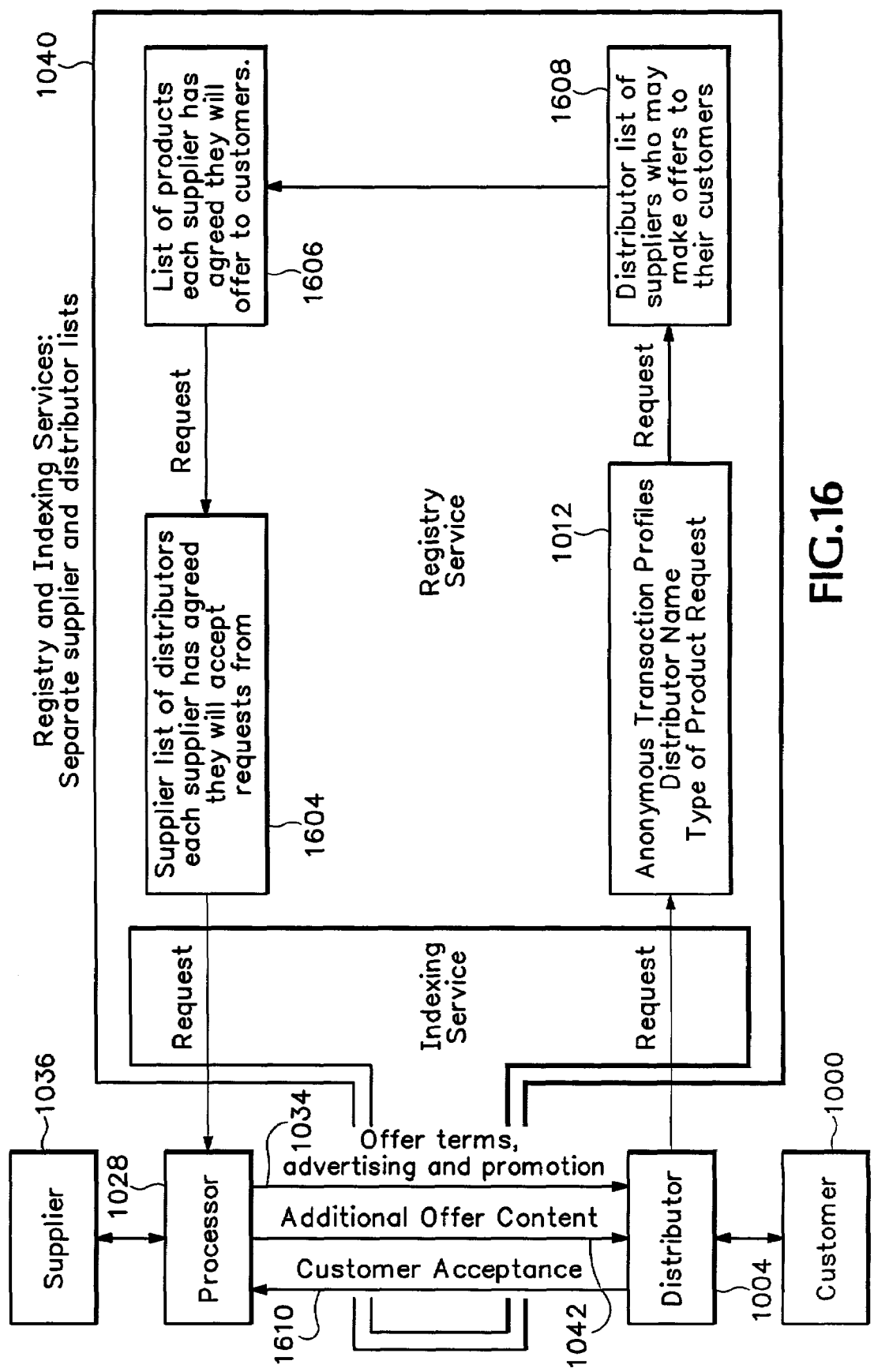
FIG. 16 is a block diagram showing the registry and indexing services with separate supplier and distributor lists.
Figure 17:
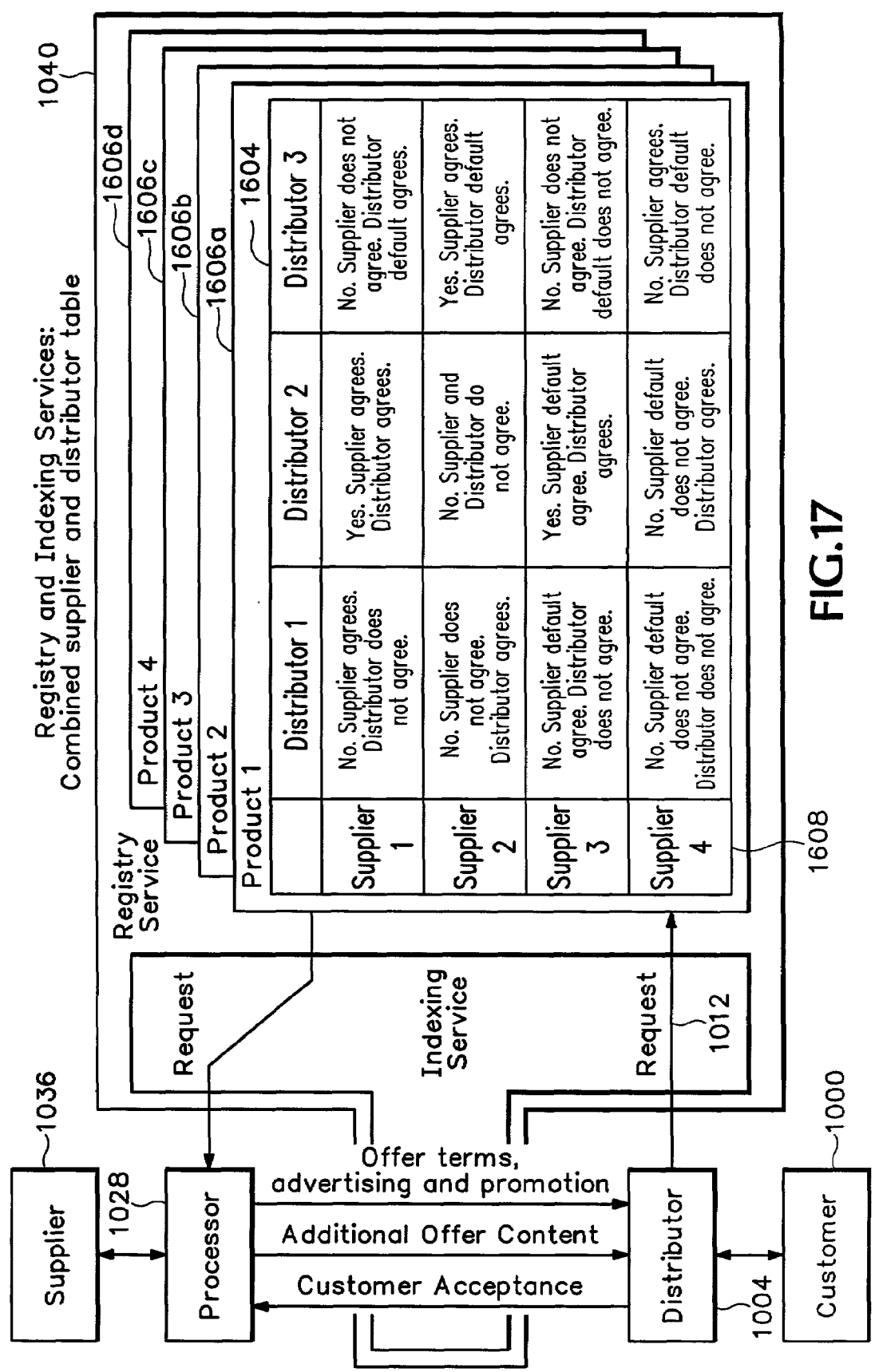
FIG. 17 is a block diagram showing the registry and indexing services with a combined supplier and distributor table.

FIGS. 16 and 17 describe in more detail the indexing and registry services 1040. FIG. 16 shows a registry and indexing service 1040 with separate supplier and distributor lists 1606 and 1608, respectively, and FIG. 17 shows a registry and indexing service 1040 with a combined supplier and distributor table.

The registry and indexing service 1040 manages and records the transmission of information between distributors 1004 and processors 1028. The registry service 1040 may establish criteria, rules and requirements for consumers, distributors, suppliers, retailers, advertisers and marketing companies to transact business in the system.

The registry service 1040 may determine consumers, distributors, suppliers, retailers, advertisers and marketing companies that may or may not transact. The registry service 1040 can determine the maximum number of requests a consumer may make or the maximum or minimum number of consumers a distributor may have. The registry service 1040 may determine the maximum or minimum number of offers or advertisements a supplier, retailer, advertiser and marketing company may make or the process by which a company or third-party may obtain a consumer's anonymous transaction, advertising, or dating profile.

The registry service 1040 may determine the process by which a supplier, distributor, retailers, advertiser, marketing company or third-party obtain a consumer's personal information record. That process may require any combination of a unique identification number, a consumer password, and a second consumer password.

The registry service 1040 may store and manage consumer anonymous transaction profile records, anonymous advertising profile records and personal information records to facilitate transactions where consumers want to provide their anonymous or personal information to third parties without the requirement of acting through a distributor.

The registry service 1040 stores and processes information submitted by suppliers 1036 and distributors 1004. Information submitted by suppliers 1036 includes a list 1604 of distributors suppliers have agreed or not agreed they will accept requests.

The indexing and registry service 1040 may default suppliers to accept requests from all distributors, may default suppliers 1036 to accept requests from no distributors or may default suppliers to accept requests from some distributors based on any criteria until a supplier 1036 selects distributors they agree to accept requests from and those they will not accept requests from. Information submitted by suppliers 1036 includes a list of products 1606 suppliers have agreed they will offer to consumers. In the table system shown in FIG. 17, there may be one table 1606*a*-1606D for each product.

Information submitted by distributors 1004 includes a list of suppliers 1608 who may make offers to their consumers 1000. The indexing and registry service 1040 may default distributors 1004 such that all suppliers 1036 may make offers to consumers 1000 or default distributors such that no suppliers 1036 may make offers to consumers 1000. The service 1040 may alternatively default such that some suppliers 1036 may make offers to consumers 1000 based on any criteria, until a distributor 1004 selects suppliers 1036 who may or may not may make offers to their consumers 1000.

The registry service 1040 directs requests for offer 1012 to the correct processor(s) 1028 and suppliers 1036 according to the requests 1012 and all the criteria in lists 1608, 1606, and 1604. Each request 1012 must be sent to the correct processors 1028 for the suppliers 1036 who have both selected to accept requests for the distributor 1004 initiating the request and been selected by the distributor 1004 initiating the request 1012 to make offers to their consumers 1000.

A processor 1028 may contain only one or multiple supplier's criteria and offer terms, advertising and promotion. The supplier lists 1604, 1606 and distributor lists 1608 may be saved in different tables. One table contains a list of distributors a supplier will accept requests from, another table contains a list of products a supplier has agreed they will offer to consumers and another table contains a distributor list of suppliers who may make offers to their consumers.

The supplier and distributor lists may be merged into one table of products, suppliers and distributors as shown in FIG. 17. The registry service 1040 creates a unique transaction number for each request for offer 1012 received from a distributor 1004. The registry service 1040 also creates a unique supplier offer number for each offer received from a processor 1028 in response to a request for offer 1012.

The registry service 1040 receives offers, promotions and advertisements 1034 from processors 1028 in response to request for offers 1012 and transmits them to the proper distributor 1004. The registry service 1040 receives consumer acceptances 1610 from distributors 1004 and transmits them to the proper processor 1028 for transmission to the supplier 1036 whose offer was accepted. The registry service 1040 can also receive additional offer content 1042 from processor 1028 in response to a request for offer 1012 and transmits them to the proper distributor 1004. A record of transactions is also stored.

Advertising

The ATS 1002 can deliver advertising to consumers 1000. The intermediary computer system or computer systems operated by distributors identify consumers who may request and receive advertisements. The ATS 1002 allows intermediaries or distributors to select suppliers, distributors, retailers, advertisers, marketing companies, etc. which can advertise and market to their consumers 1000. Suppliers, distributors, retailers, advertisers and marketing companies that advertise and market to consumers are commonly called advertisers. The ATS 1002 also selects the products and services that can be advertised and marketed and the product and service criteria including price, costs and fees. Advertising can also be controlled based on the fees charged to advertisers for advertising and marketing over the ATS 1002.

Advertising fees may be based on other criteria including the type of product and service advertised, the time of day the advertisement is presented to the consumer 1000, the number of times the same advertisement is presented to the consumer, etc. Advertising fees may be set based in part on the amount of advertising content provided by the supplier, distributor, retailer, advertiser or marketing company or on the amount of advertising content viewed by the consumer 1000.

All advertisements may be made available through the ATS system 1002 to consumers 1000 or specific advertisements, products or services may be selected. Criteria 1032 may be selected that excludes advertisements of specific products or services to consumers 1000. Advertisements may be supplied directly to consumers or may be provided by third-party suppliers directly to consumers. Third-party suppliers, distributors, retailers, advertisers or marketing companies may be permitted to provide product advertisements directly to their consumers.

All advertisers available through the ATS may be allowed to advertise to consumers or may specific advertisers may be selected or excluded based on any criteria. The intermediary or a distributor may select advertisements from suppliers, distributors, retailers, advertisers or marketing companies according to vicinity in relation to the consumer 1000. The intermediary or distributor are notified when new suppliers, distributors, retailers, advertisers or marketing companies are entered into the ATS 1002 and may be provided with options to select or exclude the new advertisers.

Figure 15:
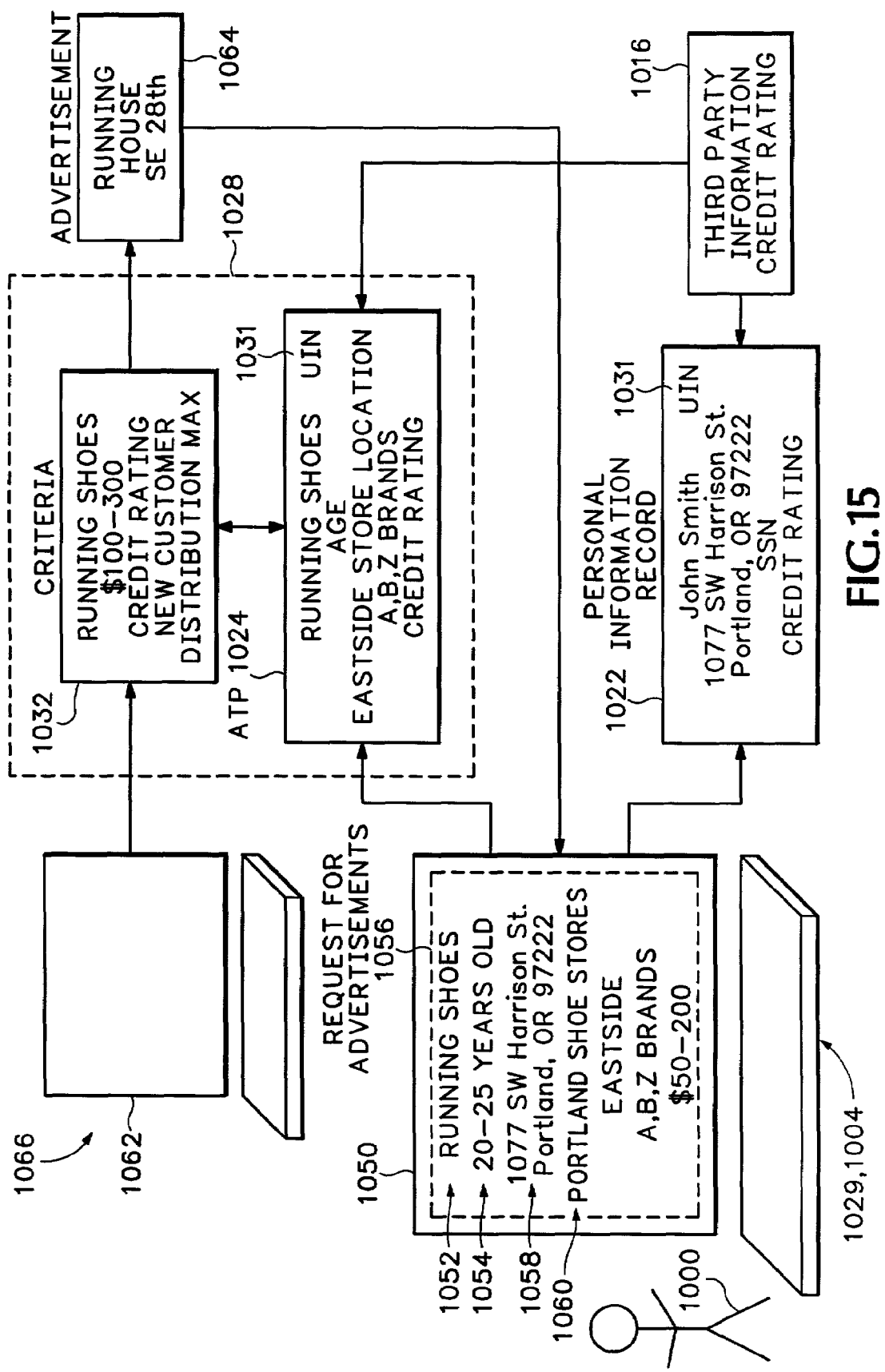
FIG. 15 is a block diagram showing how the ATS is used for advertising.

Referring to FIG. 15, consumers 1000 complete a request for advertisements based on the options established by a computer 1050 operated by the intermediary 1029 or distributor 1004. The request for advertisements 1056 can contain one or more product request(s) 1052, such as a product request for running shoes. The request for advertisement 1056 can also contain personal information 1058, such as a home address, and anonymous information 1054, such as an age range of the consumer 1000. Personal information 1058 and anonymous information 1054 may contain demographic, business and employment information.

The consumer 1000 elects to receive advertisements from any combination of suppliers 1060, based on already established relationships, new suppliers or location. Types of advertisements can be selected so that when an advertisement is entered by an advertiser that meets the consumer selected criteria; the requestor is notified by email.

Personal information and anonymous information is used to request the consumer's third-party information 1016. The third-party information 1016 can be the same information that is described above for financial services. For example, the third-party information can include a credit report, income, driver record, etc. The third-party information provider 1008 (FIG. 9), such as a credit bureau, provides the third-party information 1016. An ATP 1024 is then created. Additional information necessary to receive advertisements for future products and services can be added to the existing ATP 1024 without reentering information previously entered and saved.

The personal request for advertisements 1056 and the personal third-party information 1016 are used to create a personal information record 1022, if one was not already been created. The personal information record 1022 includes the same unique identification number 1031 used in the ATP 1024.

A continuous matching scheme is used by a processor 1028 to compare the ATPs 1024 with advertising criteria 1032 in a manner similar to that described above in FIG. 9. Suppliers, distributors, retailers, advertisers or marketing companies 1066 have a computer 1062 for creating advertising criteria 1032 that the ATP 1024 must meet before an advertisement 1064 is presented to a consumer 1000. Only the ATPs 1024 meeting the specified criteria 1032 will be matched with advertisements 1064. All other ATPs 1024 will not be matched with advertisement 1064.

A model can be created that uses information in the ATP 1024 to determine if an advertisement 1064 is provided. The model uses pre-set values, tables, criteria or analytical models to determine which advertisements 1064 and additional advertising contents will be provided to consumer 1000 according to values in the ATP 1024. The decision to send an advertisement 1064 to a consumer 1000 can also be performed manually. Advertisers can compare the terms and conditions of their advertisements to advertisements from other suppliers to the same consumers 1000 meeting criteria 1032.

Criteria 1032 can be specified to target existing consumers who are shopping for new products or services, new consumers, consumers requesting two or more products, consumers who already have one or more products or services from the same supplier. Advertisements for cross-sell products or services may be different than other advertisements for new requestors who are not currently consumers or advertisements not contingent on requestors being current consumers. Additional advertising content may include company information, community relations information, local offices, corporate sponsorships and application forms and may be in the form of text, graphics, video, audio, etc.

Suppliers 1066 can be notified when new distributors are added to the system and may be provided with options to select or exclude the new distributors. Suppliers 1066 can also select criteria for the maximum distribution costs for each advertisement similar to that described for other services in FIG. 10. Consumers 1000 using distributors charging in excess of the supplier's maximum distribution costs may not be matched for the advertisement. Suppliers can limit the number of advertisements made to consumers for any one advertisement. Suppliers can use continuous matching, continuous modeling or manual processing methods for processing the ATPs 1024.

The information contained within the ATP 1024 can be transmitted to one or more processors 1028. The processor 1028 may be one or more suppliers, distributors, retailers, advertisers or marketing companies. One location and format for the ATP 1024 would be a cookie stored on a browser or on a consumer computer.

Wireless Applications

Figure 18:
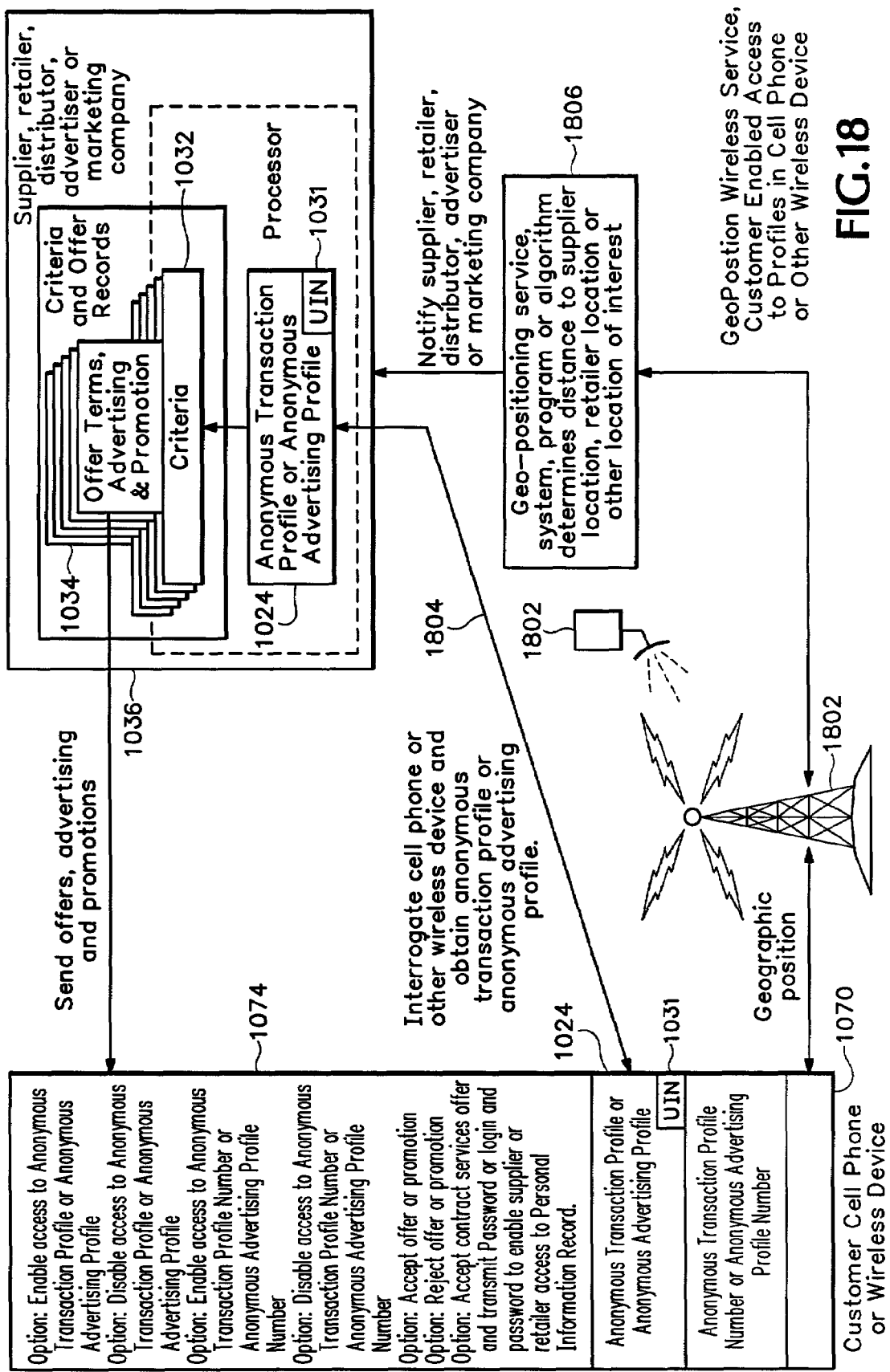
FIG. 18 is a block diagram showing how the ATS is used in a wireless environment with an ATP located in a wireless device.
Figure 19:
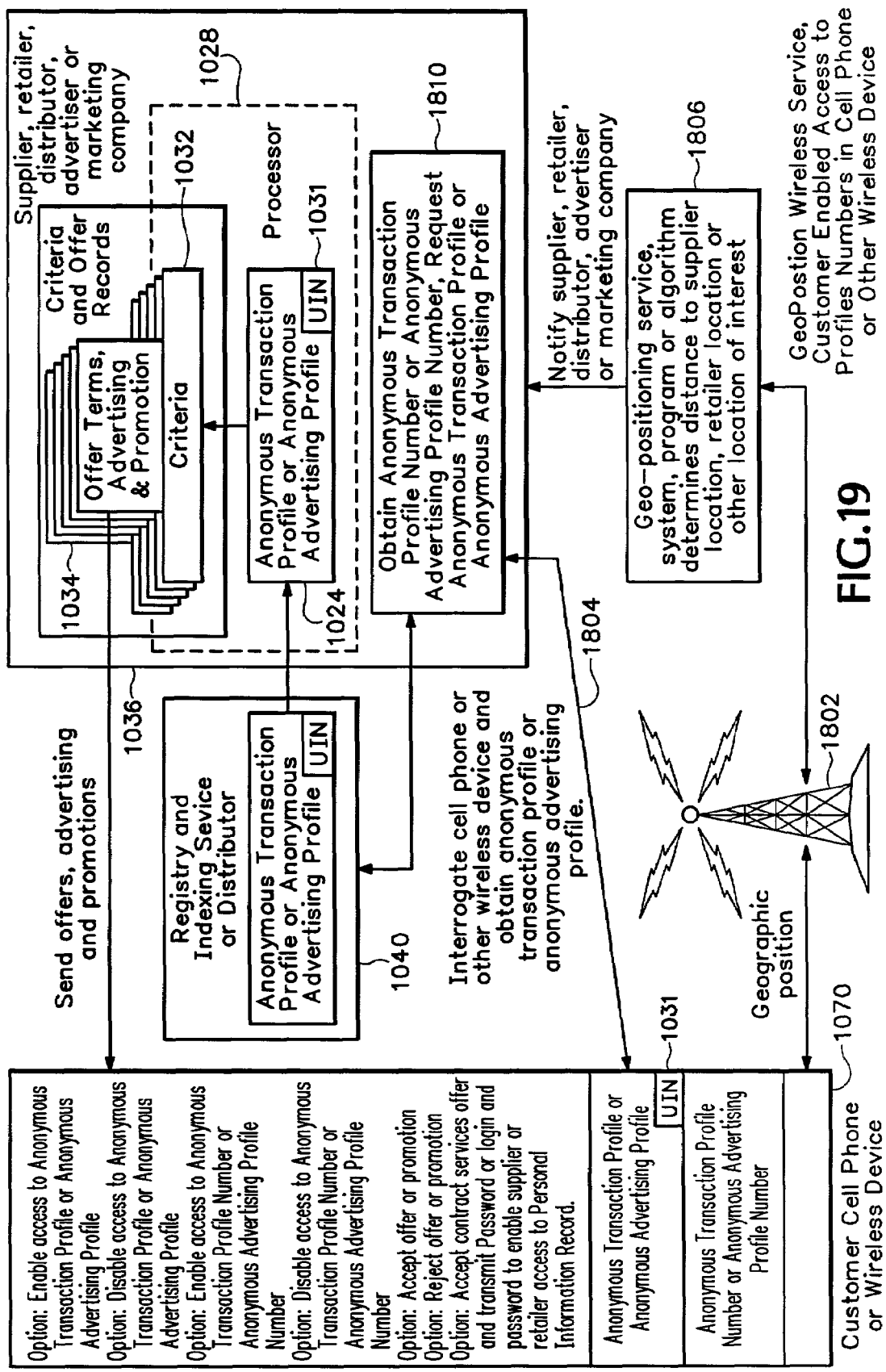
FIG. 19 is a block diagram showing how the wireless ATS is used with a registry and indexing service or distributor with a unique identification number located in the wireless device.
Figure 20:
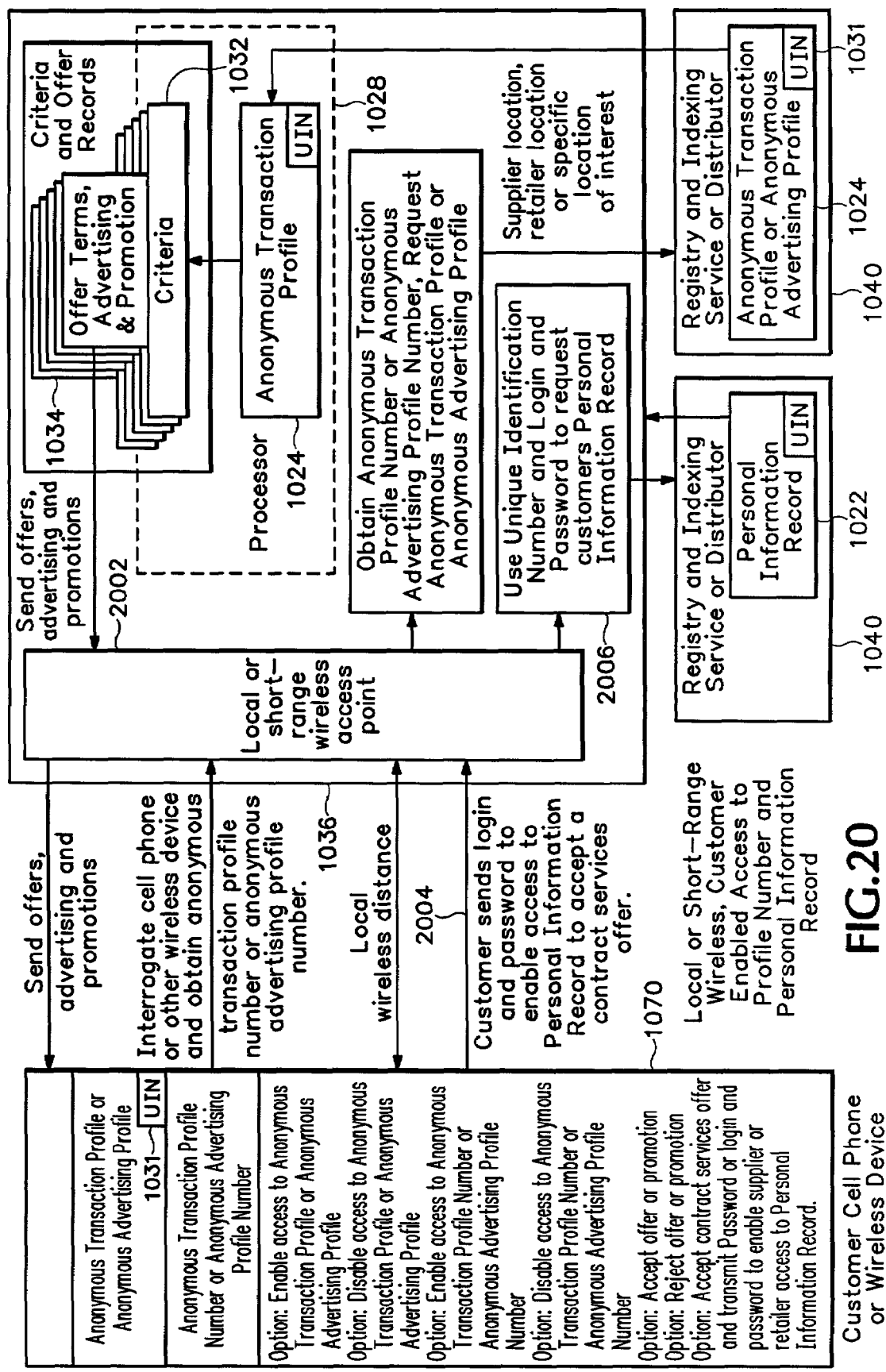
FIG. 20 is a block diagram showing how the wireless ATS is used with multiple registry and indexing services.

The ATS 1002 can be implemented in a wireless system. FIGS. 18-20 show how a wireless system allows suppliers to deliver products and services at the exact time and place the consumer is making a purchase evaluation or decision. Suppliers can select consumers with the demographic, business, employment, credit, insurance and health historical characteristics they want when the consumer enters a premises.

Referring to FIG. 18, the consumer enables suppliers 1036 to access the anonymous transaction profile 1024 or anonymous advertising profile located in the cell phone or other wireless device 1070. The ATP 1024 is accessed when the consumer is in, near or approaching a supplier location 1036, such as a bank, or a retailer location, such as a clothing store, or a specific location of interest based on geographic location (geo-positioning) 1806. Obtaining the geo-position of a mobile device, using a positioning system, such as a Global Positioning System, is known to those skilled in the art, and is therefore not described in further detail. The supplier 1036 accesses the ATP 1024 in their wireless device 1070 using local or short-range wireless signal 1804 such as Bluetooth, 802.11, Local Area Wireless Network, Wireless Local Loop, etc.

Suppliers 1036 process the information contained within ATP 1024 and make a decision whether or not to provide an advertisement, marketing material, offer or other promotion. If the criteria 1032 is met by the ATP 1024 matching the UIN 1031, the supplier 1036 selects or creates an advertisement, marketing material, retail offer, promotion or contract service offer 1034 corresponding to the matching criteria 1032. Suppliers 1036 then transmit offer or advertisement 1034 to the consumer's wireless device 1070.

In one example, the consumer accepts the offer or promotion 1034 by selecting a button 1074 on their wireless device 1070. The acceptance 1076 is transmitted directly back to the supplier 1036 or through an intermediary system to the suppler 1036 using dial-up, wide area network internet, private network, virtual private network or wireless systems.

There are several options that the consumer can enable in the wireless device 1070. One option enables or disables access of the ATP 1024 by the supplier. Another option enables access to the ATP 1024 or UIN 1031 in the wireless device. The consumer has the option to accept or reject an offer or promotion. There is also an option to accept a contract services offer and transmit a password or login to enable a supplier 1036 to access a consumer's PIR 1022.

FIG. 19 shows how the wireless ATS operates in conjunction with a registry and indexing service 1040. In FIG. 19, instead of accessing the ATP 1024 in the wireless device 1070, the supplier 1036 accesses the transaction profile number (UIN) 1031 in the wireless device 1070. After the UIN number 1031 is obtained from the wireless device 1070, the supplier 1036 uses the number to cross reference an ATP 1024 for the consumer in the registry service 1040. The ATP 1024 is then sent to the processor 1028 and any offers 1034 sent back to the wireless device 1070.

FIG. 20 shows another implementation of the wireless ATS system. The supplier computer system 1036 interrogates the wireless device 1070 through a local or short-range wireless access point 2002 to obtain the UIN 1031. The supplier 1036 uses the UIN 1031 to obtain an ATP 1024 associated with the UIN 1031 and uses processor 1028 to determine if any offers 1034 will be sent to the wireless device 1070. The consumer sends a login and password 2004 to the supplier 1036 to accept the offer. The supplier then uses the unique identification number, login, and password in process 2006 to request a PIR 1022 for the consumer. The PIR 1022 may be in the same or a different registry 1040 as the registry storing the ATP 1024.

Smart Cards

Commercially available smart cards carry around account information in an integrated circuit. The ATS 1002 can access a UIN 1031 on the smart card enabling consumers to transmit their anonymous transaction profile, anonymous advertising profile or personal information record to another company. Some e-information may be transmitted and incorporated into a new record or an application.

Exchange Wallet

Consumers can enter some or all of their debit, credit and asset account information with an intermediary or a distributor and create an anonymous consumer exchange wallet record. The ATS 1002 can supply the consumer owning the exchange wallet with a new name that can be used for conducting transactions. This allows the consumer to remain anonymous when paying for services. However, the false name can be traced back to a real person for legal or financial reasons.

Consumers 1000 manage their accounts by specifying which debit card accounts, credit card accounts, credit line and asset account to use first, up to a specified or maximum amount, and which account to use second, etc. Alternatively, the consumer can specify how charges should be applied to minimize finance charges, maximize airline miles, etc.

Consumers provide the anonymous consumer wallet with the false name to the suppliers for making a purchase, in lieu of a credit card number. Retailers request charge authorization from the intermediary server system or a distributor. The consumer exchange wallet includes logic specified by the consumer that selects which account to apply the charge. For example, the exchange wallet logic may identify a first credit card account for purchasing retail items at a particular retail store and a second credit card account for purchasing airline tickets. The consumer may select, for example, a retail store credit card for purchasing items from that same retail store. That may be because the consumer automatically gets a discount at that retail store for using that store credit card. For all other retail purchases, the exchange wallet logic may select a bank credit card.

Charge authorization is requested from the selected debit card, credit card, credit line or asset account supplier by the ATS 1002. After receiving authorization from the selected supplier, the ATS 1002 authorizes the charge to the retailer. The consumer can complete an anonymous transaction profile 1024 and personal information record 1022 before, after, or at the same time, the exchange wallet is created. The consumer may also use current debit card, credit card and/or credit line balances in the exchange wallet logic to determine which account to direct the charge to.

Dating Services

Figure 21:
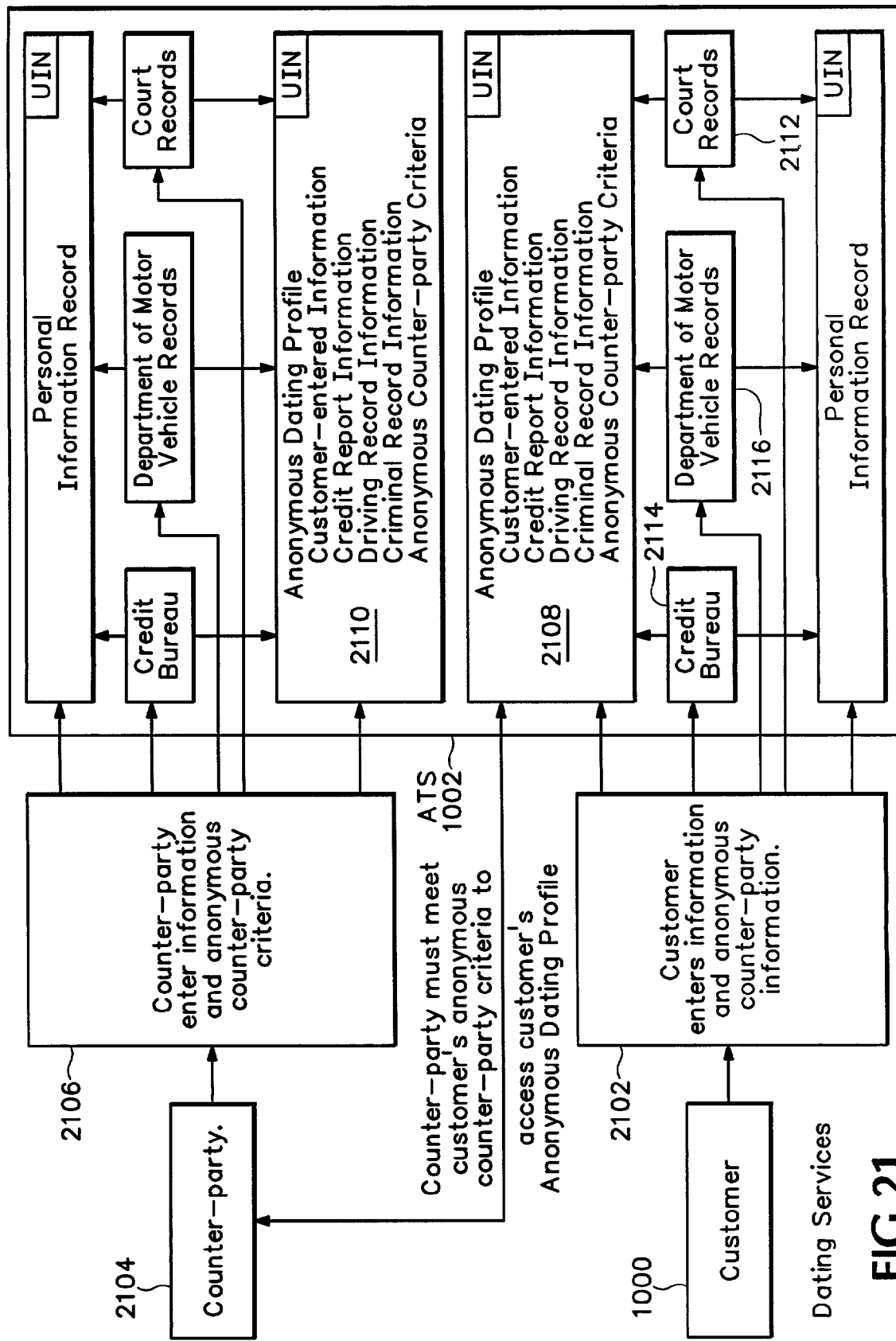
FIG. 21 is a block diagram showing how the ATS is used for dating services.

FIG. 21 shows how the ATS is used for dating services. Dating services use any variety of the network transaction, network advertising or wireless network service. Consumers set anonymous criteria for the counter-parties 2104 they would like to interact with. The anonymous criteria 2102 may be based on information entered by the counter-party 2104 or counter-party information obtained from third-parties.

Counter-party criteria in the consumer's Anonymous Dating Profile (ADP) 2108 is used to screen counter-parties 2104. Only counter-parties 2104 meeting the consumer's anonymous counter-party criteria in the ADP 2108 are provided with access to the consumer's profile. The counter-party criteria in 2108 may be used to screen counter-party Anonymous Dating Profiles 2110. The consumer 1000 accesses only counter-party Anonymous Dating Profiles 2110 meeting their anonymous counter-party criteria in ADP 2108.

Anonymous counter-party criteria may include age (between 45 and 50 years old), ethnicity (Pacific Islander), preferences (enjoys hiking), or any other feature, characteristic or belief of the person. Anonymous counter-party criteria may also include court records 2112 (no misdemeanor or felony convictions except for speeding tickets), minimum education requirements (must have masters degree or equivalent), credit information 2114 (must have a credit score above 750 FICO), driving record 2116, or any other qualifications, history or experience.

The ATS 1002 obtains third-party information 2112, 2114, and 2116. The ATS 1002 merges the anonymous information and the anonymous third-party information 1020 and creates the ADP 2108. Anonymous information when used in conjunction with dating services may include a picture of the consumer, graphic likeness of the consumer, video record of the consumer, audio record of the consumer, etc.

The anonymous dating profile 2108 may contain specific anonymous information or may contain ranges of information or segments of information ranges. The consumer 1000 enters anonymous counter-party criteria 2102 that third parties must meet to obtain access to the consumer's anonymous dating profile 2100. The ATS 1002 compares the anonymous counter-party criteria 2108 with the anonymous dating profile 2110.

Selected third parties 2104 may include only consumers who have created their own anonymous dating profiles or consumers meeting some or all of the anonymous counter-party criteria provided by the consumer and who have created their own anonymous dating profiles.

Third parties may sort, screen, filter, segment and target the anonymous dating profiles and may select one or more anonymous dating profiles. Third parties may transact with the consumers represented by the selected anonymous dating profiles by sending contact information directly to the consumer, sending their anonymous dating profile 2110 to the consumer 1000 or by sending a message directing the consumer to their anonymous dating profile in the ATS 1002. Consumers and third parties may communicate through the ATS 1002 without revealing their personal information or addresses.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention can be modified in arrangement and detail without departing from such principles. We claim all modifications and variations within the spirit and scope of the following claims.

The invention claimed is:

1. A method of electronically providing anonymous transaction services, comprising:

electronically communicating at an intermediary computing system over a computer network remotely with both clients, loan suppliers, and at least one third party credit bureau service;

using the intermediary computing system to electronically compile client loan application files provided by the clients over the computer network, the client loan application files including loan application data sets that contain personal client loan application information that uniquely identify the clients and is not required by the loan suppliers to make pending loan offers to the clients, the client loan application files also including loan application data sets that contain anonymous client loan information that does not uniquely identify the clients and that does provide loan information required by the loan suppliers to make pending risk-based loan offers to the clients;

using the intermediary computing system to electronically compile third party credit bureau report files from a third party credit bureau service that operates externally and independently from the intermediary computing system and externally and independently from the loan suppliers, the third party credit bureau report files including both personal client credit report information that uniquely identifies the clients but is not required by the loan suppliers to make the pending risk-based loan offers to the clients and anonymous client credit report information that does not personally identify the clients and includes at least a credit score that is required by the loan suppliers for determining whether or not to make the pending risk-based loan offers to the clients;

using the intermediary computing system to electronically separate the personal client loan application information from the anonymous client loan information in the client loan application files;

using the intermediary computing system to electronically and automatically purge the personal client credit report information from the third party credit bureau report files received from the third party credit bureau service;

using the intermediary computing system to electronically and automatically combine the separated anonymous client loan information with the anonymous client credit report information from the purged third party credit bureau report files to form anonymous loan transaction profiles;

electronically receiving supplier criteria from the loan suppliers at an intermediary distributor, the supplier criteria indicating a maximum fee the loan suppliers are willing to pay to provide risk-based pre-approved offers to clients associated with the intermediary computing system, the intermediary distributor sending the supplier criteria to the intermediary computing system associated with at least one of the clients when a fee charged by the intermediary distributor is less than the maximum fee, electronically comparing the maximum fee to a fee charged by intermediary computing system and the fee charged by intermediary distributor;

using the intermediary computing system to electronically send the anonymous loan transaction profiles including the combined anonymous client loan information and anonymous client credit report information over the computer network to the intermediary distributor, the intermediary distributor receiving the anonymous transaction profiles from the intermediary computing system when the fee charged by the intermediary computing system and the fee charged by the intermediary distributor are less than or equal to the maximum fee and sending the anonymous transaction profiles to the loan suppliers without revealing the personal client loan application information and the personal client credit report information to the loan suppliers, enabling the loan suppliers to evaluate and selectively send pre-approved pending risk-based loan offers to at least one qualifying subset of the clients associated with anonymous client loan information and combined anonymous client credit report information qualifying for the pre-approved pending risk-based loan offers;

using the intermediary computing system to electronically receive the selected pre-approved pending risk-based loan offers from said loan suppliers and then forward the pre-approved pending risk-based loan offers to the clients; and using the intermediary computing system to electronically and automatically send the personal client loan information and personal client credit report information to associated loan suppliers for clients that accept the pre-approved pending risk-based loan offers from the associated loan suppliers.

2. The method of claim 1 including:

using a supplier computing system to electronically send supplier criteria for evaluating the anonymous loan transaction profiles to the intermediary computing system over the computer network;

using the intermediary computing system to electronically compare the anonymous loan transaction profiles with the supplier criteria and send any the anonymous loan transaction profiles that satisfy the supplier criteria to the supplier computing system;

using the supplier computing system to electronically select clients for sending the pre-approved pending loan offers based only on the anonymous loan transaction profiles received from the intermediary computing network without ever knowing the personal identity of the selected clients and electronically sending the pre-approved pending loan offers to the selected clients over the computer network.

3. The method of claim 1 including:

using a computer system to:

compile the plurality of client loan application files, send the anonymous client credit report information along with the anonymous client loan information to the loan suppliers in the anonymous loan transaction profiles to enable the loan suppliers to select subsets of clients based upon the anonymous client information and selectively provide different loan terms or loan products to the selected subsets of clients according to the anonymous client credit report information and the anonymous client loan information in the anonymous information profile, receive pre-approved loan offers from said loan suppliers on behalf of the selected subsets of clients, and provide personal client loan information and personal client credit report information to the supplier after the client accepts the suppliers offer.

4. The method of claim 1 including using the intermediate computing system to electronically obtain the third party credit bureau report files from the third party credit bureau service using both the anonymous client loan information and the personal client loan application information and then filtering the personal client credit report information from the third party credit bureau report files and automatically attaching the filtered third party credit bureau report files to the anonymous client loan information to generate the anonymous loan transaction profiles that provide sufficient anonymous client financial information for the loan suppliers to independently make the pre-approved pending risk-based loan offers.

5. The method of claim 1 including using the intermediary computer system to electronically provide one or more of the loan suppliers with the terms of the pre-approved pending risk-based offers provided to the clients by other loan suppliers.

6. The method of claim 1 where the loan suppliers receive the personal client loan application information independently of the intermediary computer system and obtain one or more third party credit bureau report files for the clients accepting the pre-approved pending risk-based loan offers to verify the anonymous client loan information and anonymous client credit report information provided to the loan suppliers by the intermediary computer system.

7. A system for providing anonymous transaction services, comprising the steps of:
- means for compiling client files within an intermediary, including data sets that contain personal client information that uniquely identify clients and data sets that contain anonymous client information that do not uniquely identify clients and that do provide information needed by suppliers to make pre-approved offers, where the clients and at least another source external to the intermediary other than the suppliers supply the anonymous client information to the intermediary;
- means for receiving supplier criteria from at least one intermediary distributor, the supplier criteria indicating a maximum fee a supplier is willing to pay to provide risk-based pre-approved offers to clients associated with the intermediary, the intermediary distributor sending the supplier criteria to the intermediary computing system associated with at least one of the clients when a fee charged by the intermediary distributor is less than the maximum fee;
- means for comparing the maximum fee to a fee charged by the intermediary and a fee charged by the intermediary distributor;
- when the fee charged by the intermediary and the fee charged by the intermediary distributors are less than or equal to the maximum fee, means for providing the anonymous client information to the intermediary distributor, the intermediary distributor receiving the anonymous transaction profiles from the intermediary when the fee charged by the intermediary computing system and the fee charged by the intermediary distributor are less than or equal to the maximum fee and providing the suppliers with the anonymous client information from the intermediary without revealing the personal client information, enabling the suppliers to select at least one subset of clients based upon the anonymous client information;
- means for receiving and providing to the selected clients pre-approved offers from said suppliers; and
- means for giving the personal client information of a client to a supplier when the client accepts one of the pre-approved offers corresponding to the supplier.

8. A method for supplying offers for risk-based financial products, comprising:
- using a supplier computing system to electronically send supplier criteria for receiving consumer requests for risk-based financial services to a distributor computing system over a computer network, the supplier computing system operating independently and remotely from the distributor computing system, the supplier criteria indicating a maximum fee at least one supplier associated with the supplier computing system is willing to pay to provide risk-based pre-approved loan offers to customers associated with the distributor computing system, the distributor computing system sending the supplier criteria to an intermediary computing system associated with at least one of the customers when a fee charged by the distributor computing system is less than the maximum fee,
- when the fee charged by the distributor computing system and any fees charged by others distributors are less than or equal to the maximum fee, using the supplier computing system to electronically receive a plurality of anonymous transaction profiles that satisfy the supplier criteria from the distributor computing system for consumers requesting offers for the risk-based financial services, each of the anonymous transaction profiles including anonymous consumer or business loan application information generated by the consumer that is merged with anonymous third party consumer credit information generated from a third party credit reporting agency independently from the consumer or business loan application information generated by the consumer wherein all personal information necessary for personally or individually identifying the consumer has been removed from both the consumer or business loan application information and from the third party consumer credit information prior to the anonymous transaction profiles being received by the supplier computing system, the distributor computing system receiving the anonymous transaction profiles from the intermediary computing system when the fee charged by the intermediary computing system and the fee charged by the distributor computing system are less than or equal to the maximum fee and sending the anonymous transaction profiles to the supplier computing system without revealing the personal client loan application information and the personal client credit report information to the loan suppliers;
- using the supplier computing system to electronically select consumers for issuing pre-approved loan offers based entirely from the anonymous transaction profiles received from the distributor computing system without ever knowing the particular identity of the customers; and
- using the supplier computing system to electronically send the pre-approved loan offers to a subset of the consumers over the computer network.

9. The method according to claim 8 wherein one of the supplier criteria sent from the supplier computing system to the distributor computing system specifies only receiving requests for risk-based financial services from consumers having previous financial service relationships with a supplier, the distributor computing system then sending only anonymous transaction profiles back to the supplier computing system matching the previous financial service relationship supplier criteria.

10. The method according to claim 8 where the supplier criteria includes offer fees paid by a supplier to provide pre-approved offers to the subset of consumers.

11. The method according to claim 10 where the offer fees correspond with a competitive ranking of the pre-approved offer when provided to the consumers.

12. The method according to claim 8 where the supplier criteria includes acceptance fees to be paid by a supplier upon acceptance of the pre-approved offers by the consumers.

13. The method according to claim 8 including electronically providing one or more criteria selection categories at the supplier computing system, a supplier sorting the anonymous transaction profiles according to at least one of the criteria selection categories.

14. The method according to claim 8 including one or more consumers accepting the pre-approved offers and the distributor computing system then electronically and automatically providing information that uniquely identifies those consumers to the supplier computing system.

15. The method according to claim 8 including:
- electronically identifying a plurality of distributors corresponding to one or more sets of the anonymous transaction profiles, one or more of the distributors specifying distributor criteria that includes distributor conditions for a supplier to provide pre-approved offers to the consumers corresponding to that distributor;

electronically comparing the distributor criteria with the supplier criteria from the supplier computing system; and electronically identifying a subset of the distributors responsive to the comparing of the distributor criteria and supplier offer criteria.

16. The method according to claim 15 including:

electronically selecting a subset of anonymous transaction profiles associated with a subset of distributors;

electronically providing the pre-approved offers to the consumers corresponding to the selected subset of anonymous transaction profiles.

17. The method according to claim 16 where the distributor criteria includes distributor charges paid by the supplier when pre-approved offers are provided to corresponding consumers or accepted by corresponding consumers.

18. The method according to claim 17 where the distributor charges paid by the supplier include aggregated charges to be paid to multiple distributors when pre-approved offers are provided to corresponding consumers or accepted by corresponding consumers.

19. The method according to claim 15 where the comparing excludes consumers associated with one or more of the distributors from receiving pre-approved offers from a supplier.

20. The method according to claim 15 where the distributor criteria restricts the type of pre-approved offers or the content in the pre-approved offers from a supplier.

21. A method comprising:

electronically receiving supplier criteria from a supplier of risk-based financial products at a first distributor, the supplier criteria indicating a maximum fee the supplier is willing to pay to provide risk-based pre-approved offers to customers associated with the first distributor;

electronically comparing a first distributor fee charged by the first distributor to the maximum fee;

electronically sending the supplier criteria to a second distributor associated with at least one of the customers when the first distributor fee is less than the maximum fee, enabling the second distributor to compare a second distributor fee charged by the second distributor to the maximum fee and the first distributor fee;

electronically receiving anonymous transaction profiles from the second distributor at the first distributor when the first and second distributor fees are less than the maximum fee, the anonymous transaction profiles including anonymous client information that does not uniquely identify the customers and that does provide information required by the supplier to make risk-based pre-approved offers to the customers;

electronically sending the anonymous transaction profiles to the supplier without revealing personal client information that uniquely identify the customers; and electronically receiving risk-based pre-approved offers from the supplier, the risk-based pre-approved offers for at least a subset of the customers associated with the anonymous transaction profiles, and then forwarding the risk-based pre-approved offers to the subset of customers.

22. The method of claim 21 includes electronically sending the supplier criteria to a third distributor associated with at least one of the customers, enabling the third distributor to compare a third distributor fee charged by the third distributor to the maximum fee and the first distributor fee, the third distributor not providing anonymous transaction profiles associated with the customers to the first distributor when the first and third distributor fees are greater than the maximum fee.

23. The method of claim 21 where the supplier criteria indicates a maximum acceptance fee the supplier is willing to pay to when consumers associated with the first distributor accept risk-based pre-approved offers from the supplier.

24. The method of claim 21 includes electronically excluding the supplier from providing the risk-based pre-approved offers to the customers according to the terms of the risk-based pre-approved offers.

25. The method of claim 21 includes electronically excluding the supplier from providing the risk-based pre-approved offers to the customers according to the identity of the supplier.

* * * * *

UNITED STATES PATENT AND TRADEMARK OFFICE
CERTIFICATE OF CORRECTION

PATENT NO. : 7,379,913 B2 Page 1 of 1
APPLICATION NO. : 09/995298
DATED : May 27, 2008
INVENTOR(S) : Dale Everett Steele and Kenneth Alan Silva It is certified that error appears in the above-identified patent and that said Letters Patent is hereby corrected as shown below:

On the Title Page, Item (75) please replace Dale Everett Steele's address of "Portland, OR (US)" with the address --8562 Stone Avenue N, Seattle, WA 98103 (US) (206) 664-1110--.

On the Title Page, Item (75) please replace Kenneth Alan Silva's address of "Vancouver, WA (US)" with the address --601 NW 131st Street, Vancouver, WA, 98685 (US) (971) 570-1050--.

On the Title Page, Item (73) please replace Assignee Nextowrth, Inc.'s "Portland, OR (US)" address with the address --601 NW 131st Street, Vancouver, WA, 98685 (US) (971) 570-1050--.

Signed and Sealed this

Thirtieth Day of September, 2008

JON W. DUDAS
*Director of the United States Patent and Trademark Office*